(12) United States Patent
Goto et al.

(10) Patent No.: US 8,727,376 B2
(45) Date of Patent: May 20, 2014

(54) AIRBAG APPARATUS

(71) Applicant: Toyoda Gosei. Co., Ltd., Aichi-ken (JP)

(72) Inventors: Yoshiaki Goto, Aichi-ken (JP); Yasushi Masuda, Aichi-ken (JP); Koji Kawamura, Aichi-ken (JP); Hitoshi Kawabe, Aichi-ken (JP); Kensaku Honda, Aichi-ken (JP); Yuji Sato, Aichi-ken (JP); Masashi Hotta, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/750,004

(22) Filed: Jan. 25, 2013

(65) Prior Publication Data

US 2013/0200596 A1 Aug. 8, 2013

(30) Foreign Application Priority Data

Feb. 8, 2012 (JP) ................................. 2012-024876

(51) Int. Cl.
*B60R 21/262* (2011.01)

(52) U.S. Cl.
USPC ....................................... 280/730.2; 280/742

(58) Field of Classification Search
USPC .............................................. 280/730.2, 742
See application file for complete search history.

(56) References Cited

U.S. PATENT DOCUMENTS

| | | | | |
|---|---|---|---|---|
| 5,458,366 A | * | 10/1995 | Hock et al. | 280/729 |
| 5,845,935 A | * | 12/1998 | Enders et al. | 280/743.2 |
| 5,957,493 A | * | 9/1999 | Larsen et al. | 280/743.1 |
| 6,135,493 A | | 10/2000 | Jost et al. | |
| 6,293,581 B1 | * | 9/2001 | Saita et al. | 280/730.2 |
| 6,402,190 B1 | * | 6/2002 | Heudorfer et al. | 280/729 |
| 6,402,191 B1 | | 6/2002 | Sinnhuber | |
| 6,802,529 B2 | * | 10/2004 | Takedomi et al. | 280/729 |
| 6,811,184 B2 | * | 11/2004 | Ikeda et al. | 280/742 |
| 7,021,652 B2 | * | 4/2006 | Kumagai et al. | 280/729 |
| 7,594,677 B2 | * | 9/2009 | Sendelbach et al. | 280/743.1 |
| 7,597,348 B2 | * | 10/2009 | Fukuda et al. | 280/730.2 |
| 7,597,351 B2 | * | 10/2009 | Kashiwagi | 280/730.2 |
| 7,637,530 B2 | * | 12/2009 | Yamaji et al. | 280/730.2 |
| 7,669,894 B2 | * | 3/2010 | Leo et al. | 280/742 |
| 7,819,424 B2 | * | 10/2010 | Toda et al. | 280/730.2 |
| 7,909,356 B2 | * | 3/2011 | Ilda et al. | 280/730.1 |
| 7,942,438 B2 | * | 5/2011 | Smith et al. | 280/728.1 |

(Continued)

FOREIGN PATENT DOCUMENTS

| | | |
|---|---|---|
| JP | A-2000-335355 | 12/2000 |
| JP | A-2001-171464 | 6/2001 |
| JP | A-2010-143528 | 7/2010 |

*Primary Examiner* — Nicole Verley
(74) *Attorney, Agent, or Firm* — Posz Law Group, PLC

(57) ABSTRACT

An airbag includes an airbag body and an inner tube. The inner tube includes a gas upstream section located in an upstream region of an inflation gas stream fed from a gas generator and a gas outlet section that opens toward an inflatable region of the airbag body and feeds an inflation gas to the inflatable region. The gas outlet section includes a check valve section. The check valve section has a flexible and a generally tubular shape extending and opening toward the inflatable region due to pressure of an inflation gas so as to stream the inflation gas into the inflatable region. After the gas generator has finished discharging the inflation gas, the check valve section folds back toward the gas upstream section due to an internal pressure of the inflatable region and closes off the gas outlet section.

11 Claims, 20 Drawing Sheets

(56) References Cited

U.S. PATENT DOCUMENTS

| | | | |
|---|---|---|---|
| 8,006,998 B2 * | 8/2011 | Hatfield et al. | 280/730.2 |
| 8,342,571 B2 * | 1/2013 | Baumgartner et al. | 280/740 |
| 8,480,122 B2 * | 7/2013 | Ohara | 280/729 |
| 2006/0001244 A1 * | 1/2006 | Taguchi et al. | 280/729 |
| 2008/0054612 A1 * | 3/2008 | Taylor et al. | 280/740 |
| 2011/0298200 A1 * | 12/2011 | Taniguchi et al. | 280/736 |
| 2013/0200598 A1 * | 8/2013 | Honda et al. | 280/730.2 |

* cited by examiner

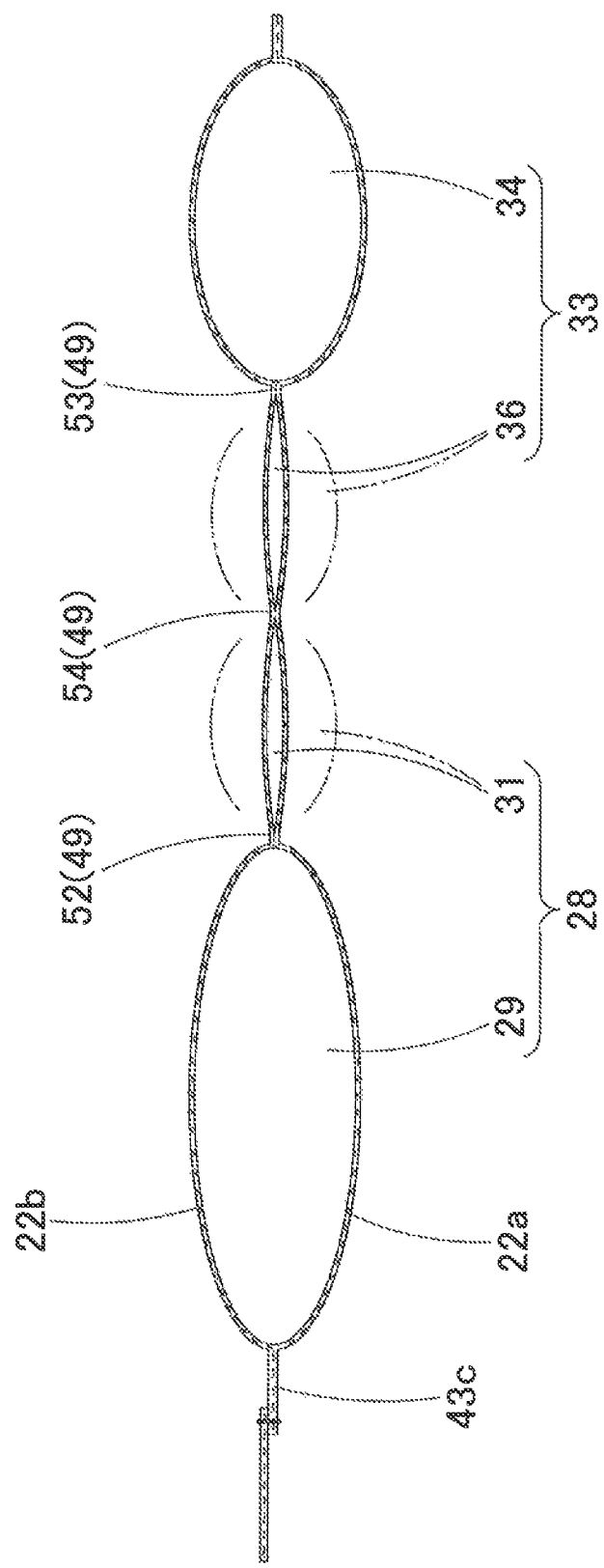

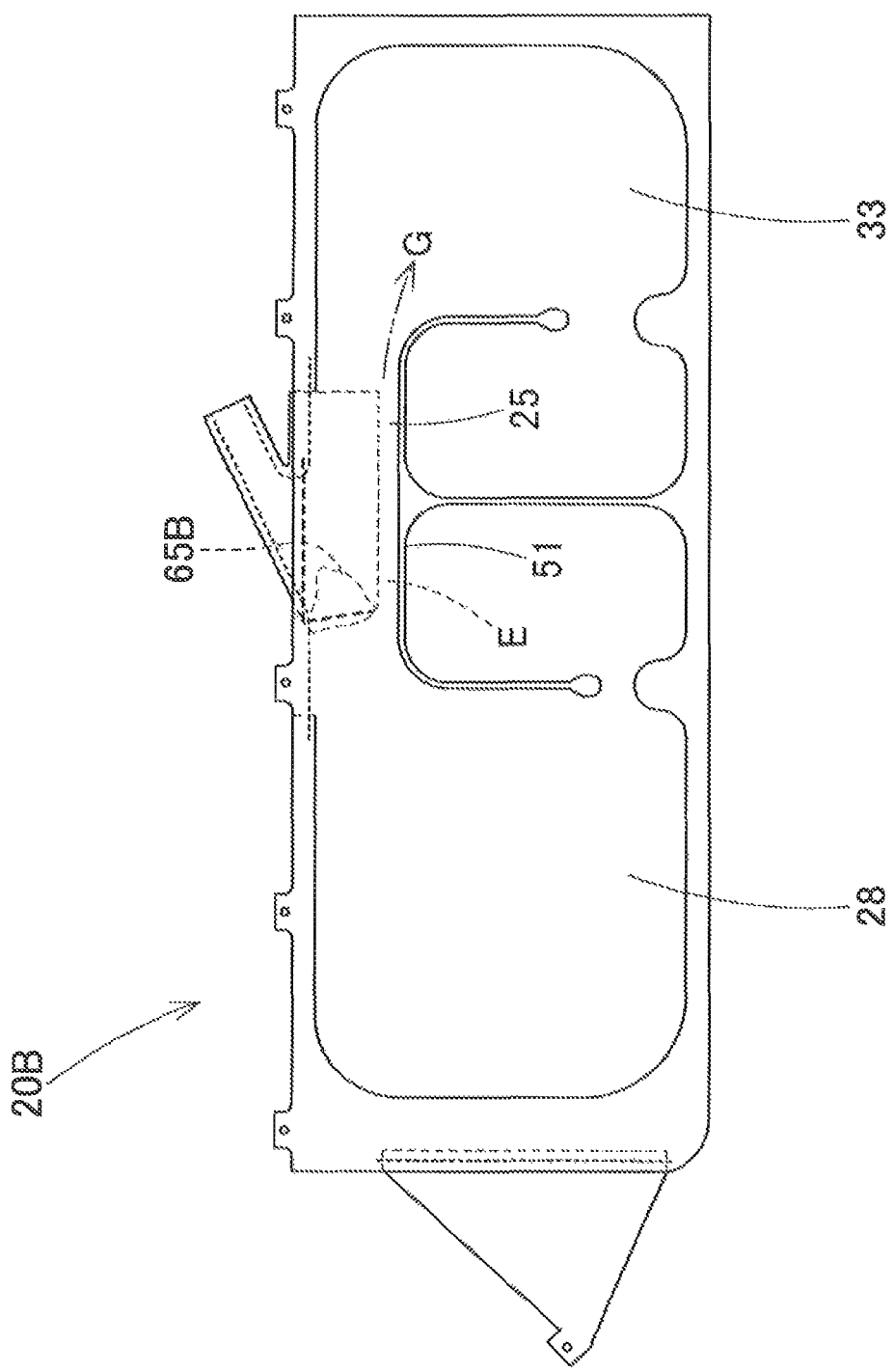

AIRBAG APPARATUS

CROSS REFERENCE TO RELATED APPLICATIONS

The Present application claims priority from Japanese Patent Application No. 2012-024876 of Goto et al., filed on Feb. 8, 2012, the disclosure of which is hereby incorporated into the present application by reference.

BACKGROUND OF THE INVENTION

1. Field of the Invention

The present invention relates to an airbag apparatus in which an inflatable airbag includes a check valve mechanism in order to prevent an internal pressure of a predetermined inflatable region from dropping.

2. Description of Related Art

It is known, as disclosed in JP 2010-143528 (paragraphs 0040-0057 and FIGS. 4-7), that an airbag of an airbag apparatus is internally provided with a check valve mechanism. The check valve mechanism is comprised of a closing wall that is located in a passage of an inflation gas and provided with a communication hole, and a valve panel that is formed of a flexible material and located in a periphery of the communication hole on a downstream side of the closing wall. With this configuration, when an inflation gas passes by, the valve panel is pushed by the inflation gas and separated from the periphery of the communication hole so as to allow the inflation gas to pass through the communication hole. Then if the inflation gas stops to pass through, an internal pressure of an inflated region of the airbag pushes the valve panel, such that the valve panel presses the communication hole and checks backflow of the inflation gas.

The above-described configuration makes the airbag compact in a folded-up configuration since the check valve mechanism is comprised of a flexible valve panel and the valve panel can be folded up together with the airbag.

However, in the conventional airbag apparatus described above, when a predetermined inflatable region of the airbag is to be inflated, an inflation gas going through the communication hole hits the periphery of the communication hole orthogonally. After passing through the communication hole, the gas further hits the valve panel directly. That is, the periphery of the communication hole and the valve panel form flow resistance and hinder quick inflation of the inflatable region.

SUMMARY OF THE INVENTION

An object of the present invention is to provide an airbag apparatus which is capable of inflating an airbag quickly and checking backflow of an inflation gas smoothly.

The airbag apparatus according to the present invention includes a gas generator and an airbag inflatable with an inflation gas fed by the gas generator. The airbag is flexible and foldable, and includes an airbag body inflatable with an inflation gas and an inner tube located inside the airbag body for guiding an inflation gas to a predetermined inflatable region of the airbag body.

The inner tube includes a gas upstream section located in an upstream region of an inflation gas stream in the inner tube, and a gas outlet section that opens toward the inflatable region for feeding an inflation gas to the inflatable region. The gas outlet section includes a check valve section for closing off the gas outlet section and preventing the inflation gas from flowing back into the inner tube after the gas generator has finished discharging an inflation gas. The check valve section has a flexible and a generally tubular shape extending and opening toward the inflatable region due to pressure of an inflation gas fed from the gas generator so as to stream the inflation gas into the inflatable region while the gas generator discharges the inflation gas. The check valve section has such a length that allows the check valve section to fold back toward the gas upstream section due to an internal pressure of the inflatable region and close off the gas outlet section, after the gas generator has finished discharging the inflation gas.

When the airbag apparatus of the invention is actuated, the gas generator discharges an inflation gas and the gas flows through the gas upstream section of the inner tube and reaches the gas outlet section. Then the gas flows out of the gas outlet section into the inflatable region of the airbag body, thus inflating the airbag body. Although the gas outlet section is provided with the check valve section, the check valve section is formed into a flexible tube that extends and opens toward the inflatable region when pushed by the gas, and therefore the gas will reach the inflatable region smoothly.

When the gas generator then finishes discharging the inflation gas, the check valve section, which had a generally tubular shape, will fold back or be pushed back toward the gas upstream section due to an internal pressure of the inflatable region, and eventually close off the gas outlet section. Thus the inflation gas will be prevented from flowing back toward the inner tube from the inflatable region.

That is, the airbag can be provided with a check valve mechanism by simply forming the check valve section with a flexible, tubular shape and predetermined length, on the gas outlet section of the inner tube for feeding an inflation gas to the inflatable region of the airbag body. This check valve section is simply formed into a generally tubular shape extending and opening toward the inflatable region when letting out an inflation gas, Accordingly the check valve section will not form a resistance to gas flow and allow an inflation gas to be smoothly delivered into the inflatable region.

Therefore, the airbag apparatus according to the present invention is capable of inflating an airbag quickly and checking the backflow of an inflation gas smoothly.

In the above airbag apparatus, it is desired that the gas outlet section provided with the check valve section is jointed with the airbag body at its region toward the gas upstream section and in a vicinity of the check valve section.

With this configuration, when the check valve section is pushed back toward the inner tube and closes off the gas outlet section due to stopping of gas supply, the check valve section will fold back on the joint that connects the gas outlet section and the airbag body, and will not fold back further than that position. That is, the check valve section will have a steady position to suppress backflow of an inflation gas.

Accordingly, the inflated inflatable region of the airbag body will have a steady volume and a steady internal pressure.

When the vicinity of the check valve section is jointed to the airbag body, it is desired that:

the airbag body includes a gas admissive region that is inflatable with an inflation gas by separating opposing walls of the airbag body and a non-admissive region that admits no inflation gas with the opposing walls attached together;

the inflatable regions of the airbag body, which are part of the gas admissive region, are partitioned by the non-admissive region;

the gas admissive region further includes a bifurcate passage that communicates the inflatable regions;

the inner tube is located in the bifurcate passage;

the inner tube includes a plurality of the gas outlet sections, the gas outlet sections being located in the bifurcate passage for streaming an inflation gas to each of the inflatable regions; and the check valve section is located on at least one of the gas outlet sections.

With this configuration, when an inflation gas fed from the gas generator reaches and inflates each of the inflatable regions of the airbag body via each of the gas outlet sections of the inner tube and then the gas generator stops discharging the inflation gas, the check valve section will close off the gas outlet section, Then the inflation gas in the closed inflatable (inflated) region will not escape to other inflatable regions. That is, the closed inflatable (inflated) region will be prevented from losing its internal pressure as much as possible, thereby keeping a desired internal pressure for cushioning an object to be protected, such as an occupant, securely, after the gas generator finishes supplying the inflation gas.

When the airbag body includes a plurality of the inflatable regions inflatable with an inflation gas fed from the gas outlet sections of the inner tube, it is desired that:

an outer diameter of the gas outlet section provided with the check valve section, at a location of a joint that connects the gas outlet section and the airbag body, is such a dimension that enables the gas outlet section to inflate integrally with the bifurcate passage at that location; and the joint is so formed as to extend up to the non-admissive region surrounding the bifurcate passage.

This configuration will shut off the bifurcate passage where the gas outlet section is located as well when the check valve section closes off the gas outlet section. If the bifurcate passage, which communicates the inflatable regions, will be closed, escape of an inflation gas from the closed inflatable region to others will be further suppressed. Therefore, the inflatable region with the check valve section will keep a desired internal pressure for cushioning a protection object even more securely after the gas generator finishes supplying an inflation gas.

When the airbag body includes a plurality of the inflatable regions, furthermore, it is desired that the inflatable region having the check valve section includes an inflatable main body and a pressure control chamber that is in gas communication with the inflatable main body via a constricted communication passage and absorbs an inflation gas from the inflatable main body via the communication passage in order to restrain a pressure build-up in the inflatable main body.

With this configuration, when the inflatable main body of the inflatable region with the check valve section is thrown against a protection object such as an occupant, the pressure control chamber will absorb an inflation gas from the inflatable main body and prevent a rapid pressure build-up of the inflatable main body which would otherwise be caused by blocking of the gas passage, thereby adequately cushioning the protection object.

In the meantime, since the inflation gas in the inflatable main body will escape only to the pressure control chamber, but not to other inflatable regions due to blocking by the check valve section, the inflatable main body will be adequately controlled in internal pressure in catching a protection object.

The invention can be applied to a head-protecting airbag apparatus that includes a curtain airbag for covering inboard sides of a front window and a rear window disposed side by side on a lateral of a vehicle. In this case it will be appreciated:

the bifurcate passage is so arranged to extend in a front and rear direction along an upper edge of and in a vicinity of a center in a front and rear direction of the airbag body of the curtain airbag as deployed;

a front window shield portion and a rear window shield portion, which serve as the inflatable region, are respectively located in front of and at the rear of the bifurcate passage and in gas communication with the bifurcate passage for covering the front and rear windows, respectively;

the gas upstream region of the inner tube is located proximate the upper edge of and in a vicinity of the center in a front and rear direction of the airbag body in such a manner as to extend upward for connection with the gas generator; and the gas outlet section includes a front outlet section and a rear outlet section that bifurcate forward and rearward at a lower end of the gas upstream section and located inside the bifurcate passage.

With this configuration, with a so-called center-arranged gas generator, which is located at an upper region of and in a vicinity of a center in a front and rear direction of the airbag having a front window shield portion and a rear window shield portion, the lower end of the inner tube, which extends downward from the gas upstream region, has the front outlet section and the rear outlet section bifurcating forward and rearward inside the bifurcate passage. This configuration will reduce gas stream lengths from the gas generator to the front and rear window shield portions, thereby decreasing the time from initiation to completion of airbag inflation. Coupled with the configuration of the check valve section not increasing flow resistance, this configuration will be suitable for a curtain airbag which is required to complete inflation in a short time. In addition, this configuration will help reduce the size of the airbag in a folded-up configuration since the inner tube can be short in a front and rear direction.

In the configuration described above, both of the front outlet section and the rear outlet section may be provided with the check valve section.

With this configuration, when the gas generator finishes discharging an inflation gas, the front window shield portion and rear window shield portion will be closed by respective check valve sections, thereby preventing respective internal pressures from moving to other regions of the airbag. Thus each of the front and rear window shield portions will maintain desired internal pressures for cushioning a head of an occupant.

It will also be appreciated that:

the check valve section is located only in the front outlet section;

an outer diameter of the front outlet section, at a location of a joint that connects the front outlet section and the airbag body, is such a dimension that enables the front outlet section to inflate integrally with the bifurcate passage at that location; and the joint is separated from the non-admissive portion surrounding the bifurcate passage so as to form a clearance between the inner tube and the bifurcate passage for communicating the front window shield portion and the rear window shield portion at full inflation of the airbag, such that an internal pressure of the front window shield portion and that of the rear window shield portion are equalized in the event of a rollover of a vehicle while the front window shield portion is prevented from losing its internal pressure in the event of a lateral collision, With this configuration, when the gas generator stops discharging an inflation gas, the check valve section will be pushed back by an internal pressure of the front window shield portion and fold back, thereby closing the front outlet section. However, the clearance formed between the inner tube and an inner circumferential surface of the bifurcate passage will communicate the front window shield portion and the rear window shield portion, such that internal pressures of the front window shield portion and rear window shield portion will be equal after a lapse of certain period of time since the gas generator stops discharging an inflation gas.

With this configuration, adequate adjustment of the clearance will, in the event of a lateral collision of a vehicle, enable the front window shield portion to secure a desired internal pressure for cushioning an occupant's head due to blocking of the front outlet section by the check valve section, and thereafter will even out an internal pressure of an entire airbag, 5 to 6 seconds after completion of gas supply from the gas generator, by way of example, so as to prevent the occupant from being thrown out of the front and rear windows. That is, the airbag has an excellent occupant restraining performance not only at lateral collision of a vehicle but also at rollover of the vehicle after lateral collision, since the airbag has an even pressure as a whole during rollover.

The invention can also be applied to a side airbag apparatus that is mounted on a lateral of a back rest of a seat for cushioning a thorax and a pelvis of a vehicle occupant by an inflated airbag. In this case, it will be appreciated:

- the airbag body is inflatable into a generally oval shape elongated in an up and down direction, wherein the bifurcate passage is located proximate a center in an up and down direction at a rear end of the airbag body on board and at full inflation;
- an upper inflatable portion and a lower inflatable portion, which serve as the inflatable region, are respectively located on an upper side and a lower side of the bifurcate passage and in gas communication with the bifurcate passage for cushioning a thorax and a pelvis of a vehicle occupant, respectively;
- the upper inflatable portion and the lower inflatable portion are partitioned by the non-admissive region;
- the inner tube is generally cylindrical in shape and located inside the bifurcate passage, and houses the gas generator which is generally columnar in shape and has gas discharge ports at a lower end thereof;
- the gas upstream region is located at an intermediate region in an up and down direction of the inner tube, where the gas generator is located; and
- the gas outlet section includes an upper outlet section and a lower outlet section that are located at an upper end and a lower end of the inner tube, respectively; and
- the check valve section is located only in the lower outlet section, With this configuration, when the gas inflator finishes discharging an inflation gas, the check valve section will close off the lower outlet section. At this time, the lower inflatable portion has received more gas and has a higher internal pressure than the upper inflatable portion, since the gas discharge ports of the gas generator are formed toward the lower inflatable portion. Accordingly, the lower inflatable portion will be allowed to keep a higher internal pressure than the upper inflatable region, due to blocking of the lower outlet section, thereby securely receiving a pelvis, which is heavy in weight.

It will also be appreciated that the airbag body further includes a joint port for connection with the gas generator and a protection region, which serves as only one said inflatable region. In this case, it is desired that the inner tube is desirably formed into a tube that extends from the joint port toward the protection portion, the gas upstream region is located at a region of the inner tube mounted around and jointed to the gas generator inserted into the joint port, and the gas outlet section is located at a region of the inner tube toward the protection portion, with the check valve section.

BRIEF DESCRIPTION OF DRAWINGS

FIG. 9 is a schematic section of the airbag of FIG. 2 as inflated, taken along line IX-IX of FIG. 2 (double dotted lines illustrate pressure control chambers as inflated);

FIG. 16 is a front elevation of the airbag of FIG. 15 in which a front outlet section of the inner tube is closed;

FIG. 188 is a front elevation of the airbag of FIG. 18A, as a check valve section of an inner tube closes off a lower outlet section;

DESCRIPTION OF PREFERRED EMBODIMENTS

Figure 1:
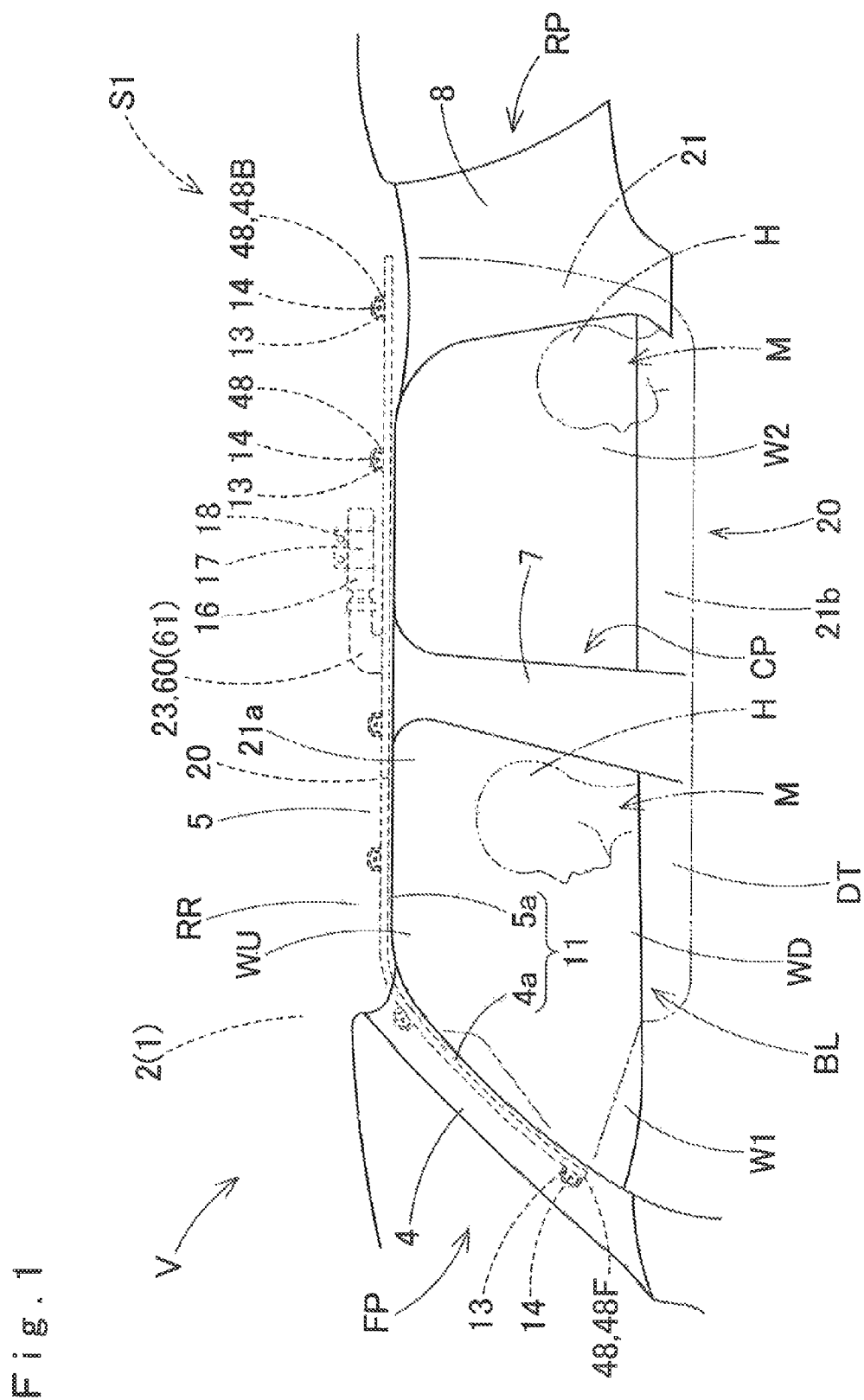
FIG. 1 is a front elevation of a head-protecting airbag apparatus according to a first embodiment of the present invention as mounted on a vehicle, viewed from an interior of the vehicle.

Preferred embodiments of the present invention are described below with reference to the accompanying drawings. However, the invention is not limited to the embodiments disclosed herein. All modifications within the appended claims and equivalents relative thereto are intended to be encompassed in the scope of the claims, FIG. 1 illustrates an airbag apparatus S1 of the first embodiment of the present invention, in the form of a head-protecting apparatus. The airbag apparatus S1 includes a curtain airbag (hereinafter referred to as an "airbag") 20, an inflator 16 as a gas generator that feeds an inflation gas to the airbag 20, an airbag cover 11 and mounting brackets 13 and 17. The airbag 20 is folded up and stored in upper rims WU of windows (side windows) W1 and W2 of a vehicle V, which windows being disposed one behind the other at a side of a front seat and a rear seat inside a vehicle V. That is, the airbag 20 is stored extendedly in a lower peripheral region of a front pillar FP to a region above a rear pillar RP, via a region above a middle pillar CP. The airbag 20 includes an airbag body 21 that is inflatable for covering the windows W1 and W2 and an inner tube 60 that is inserted in an interior of the airbag body 21.

As shown in FIG. 1, the inflator 16 is formed into a generally cylindrical contour and is inserted into a joint port 23 of the airbag 20 and thus joined with the airbag 20, The joint port 23 serves as an inlet of an inflation gas G. The inflator 16 is secured to an inner panel 2 at a roof side rail RR located in a vicinity of an upper region of the middle pillar CP, with a mounting bracket 17 holding the inflator 16 and mounting bolts 16 for securing the bracket 17 to the inner panel 2. The inflator 16 is covered with a lower edge region 5a of a roof head liner 5. The inner panel 2 belongs to a vehicle body structure 1 of the vehicle V.

The inflator 16 is under control of a predetermined control device for detecting a side impact of the vehicle V. The inflator 16 has an output corresponding to a volume of the airbag 20 (more precisely, of the airbag body 21), which is so determined that a later-described protection region 27 can maintain a predetermined internal pressure at the time of a side impact and during a rollover.

The mounting brackets 13 secure later-described mounting portions 48 of the airbag 20 to the inner panel 2 by mounting bolts 14. Each of the bolts 14 is fastened into a screw hole on the inner panel 2 provided with a nut or the like.

As shown in FIG. 1, the airbag cover 11 is comprised of a lower edge region 4a of a front pillar garnish 4 arranged on the front pillar FP and the lower edge region 5a of the roof head liner 5 arranged on the roof side rail RR.

Figure 2:
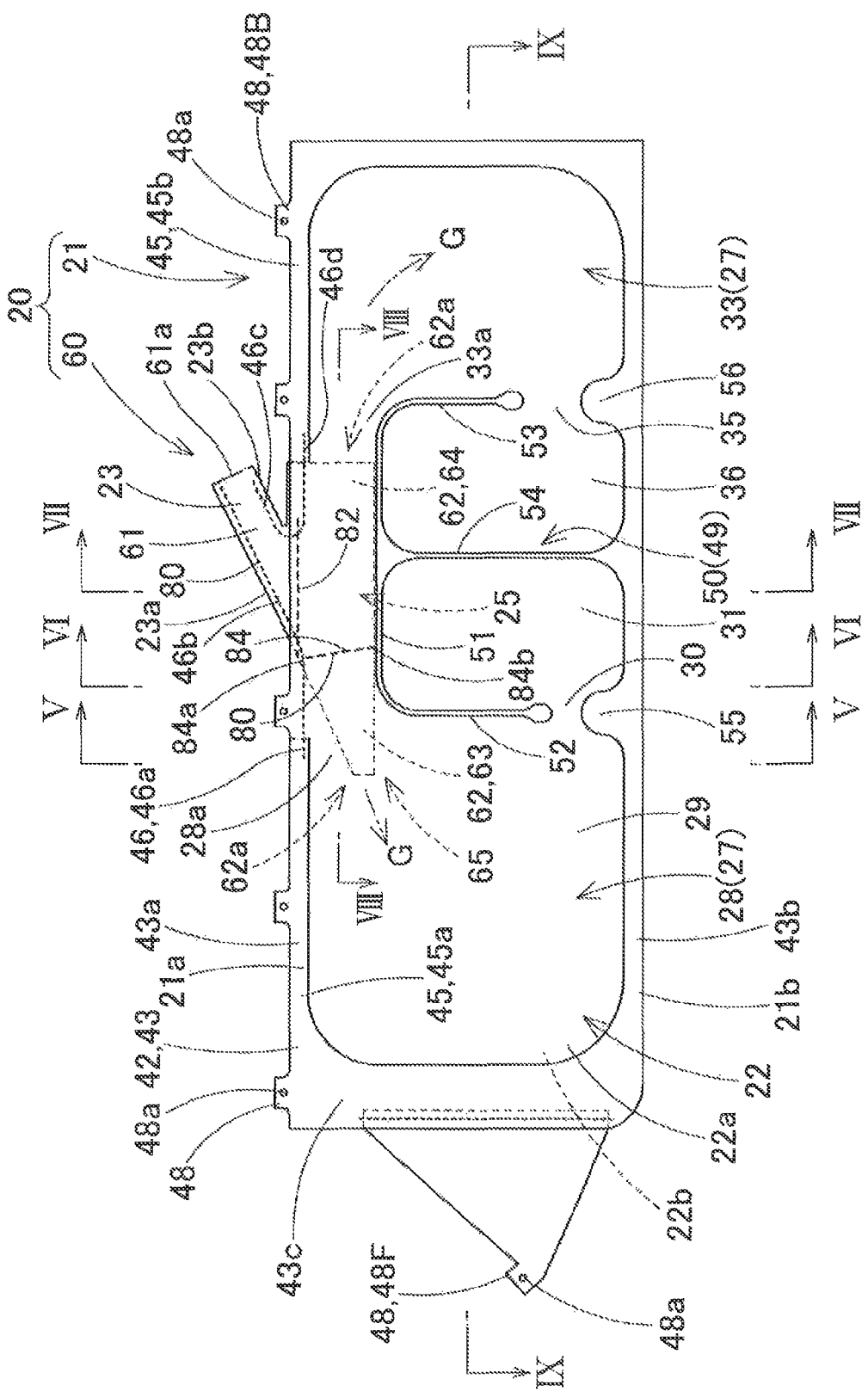
FIG. 2 is a front elevation of an airbag (a curtain airbag) for use in the airbag apparatus of the first embodiment as is flattened.
Figure 3:
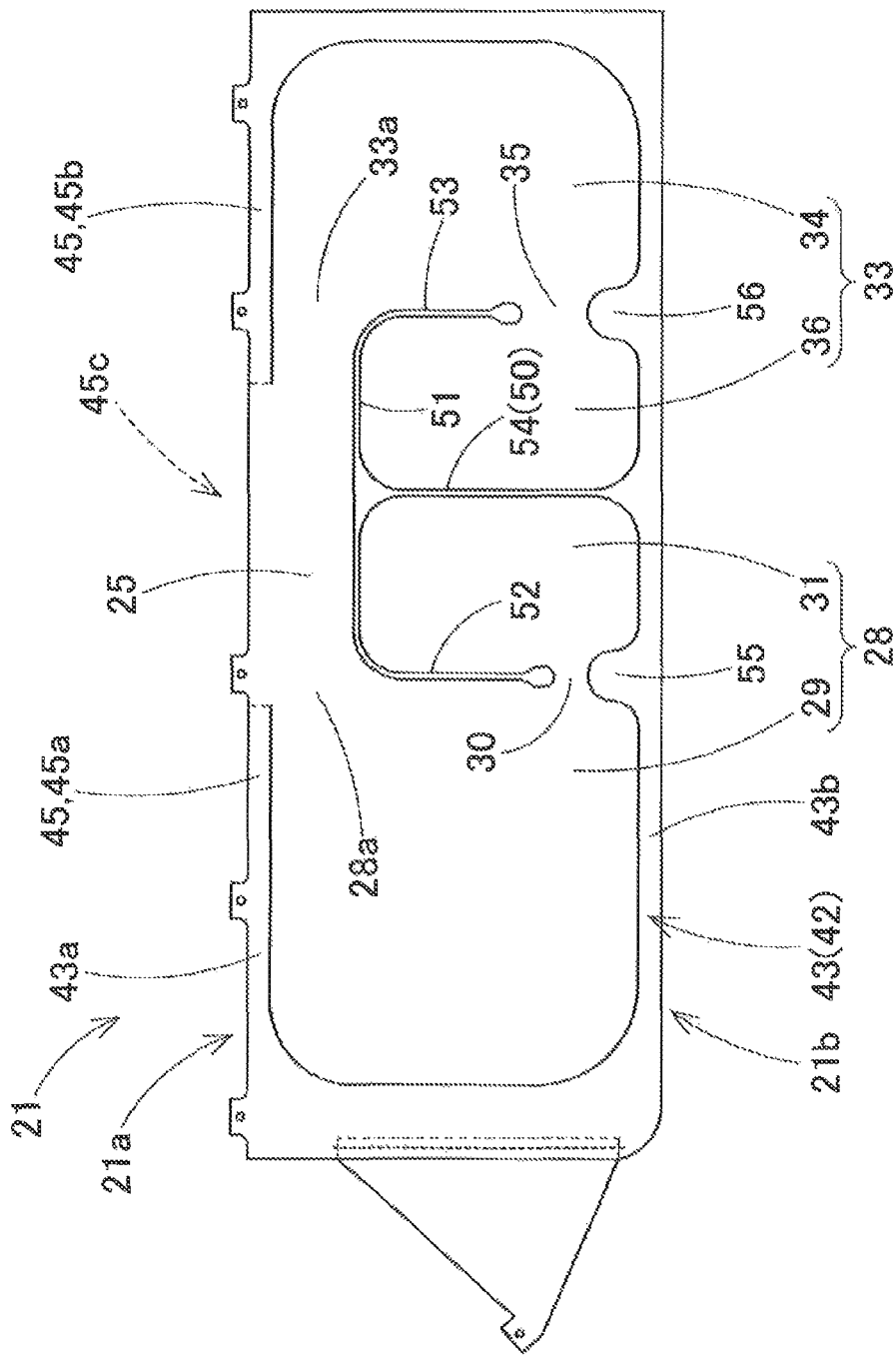
FIG. 3 is a front elevation of an airbag body of the airbag of FIG. 2.
Figure 4A:
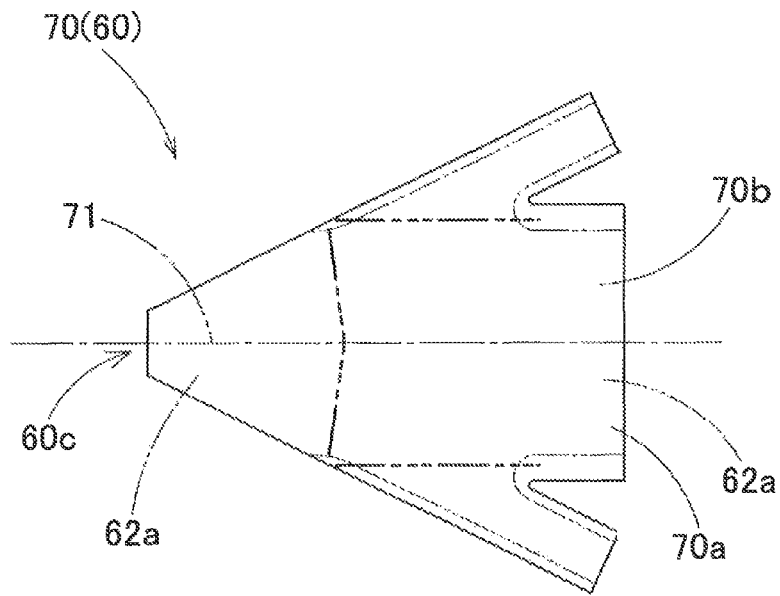
FIG. 4A illustrates an inner tube sheet to be formed into an inner tube for use in the airbag of the first embodiment.
Figure 4B:
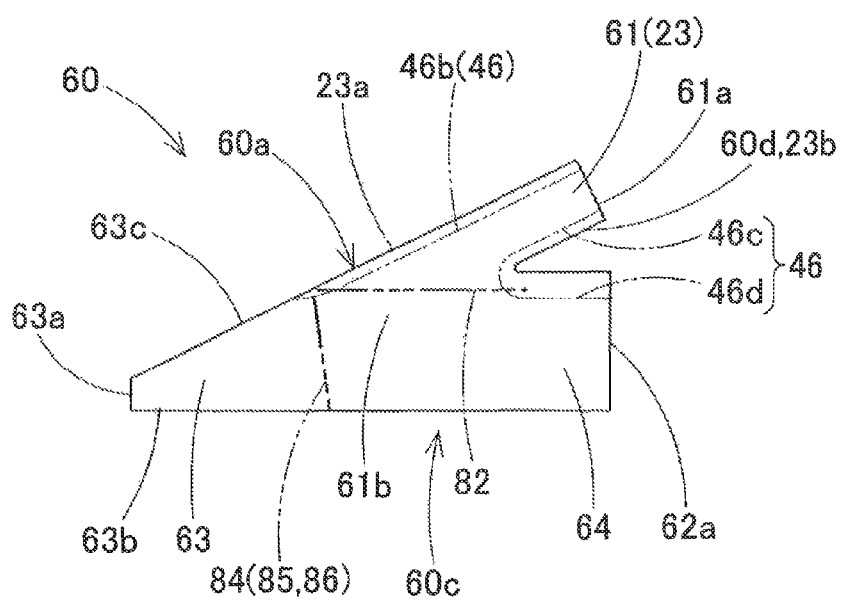
FIG. 4B illustrates the inner tube formed of the inner tube sheet of FIG. 4A.
Figure 5:
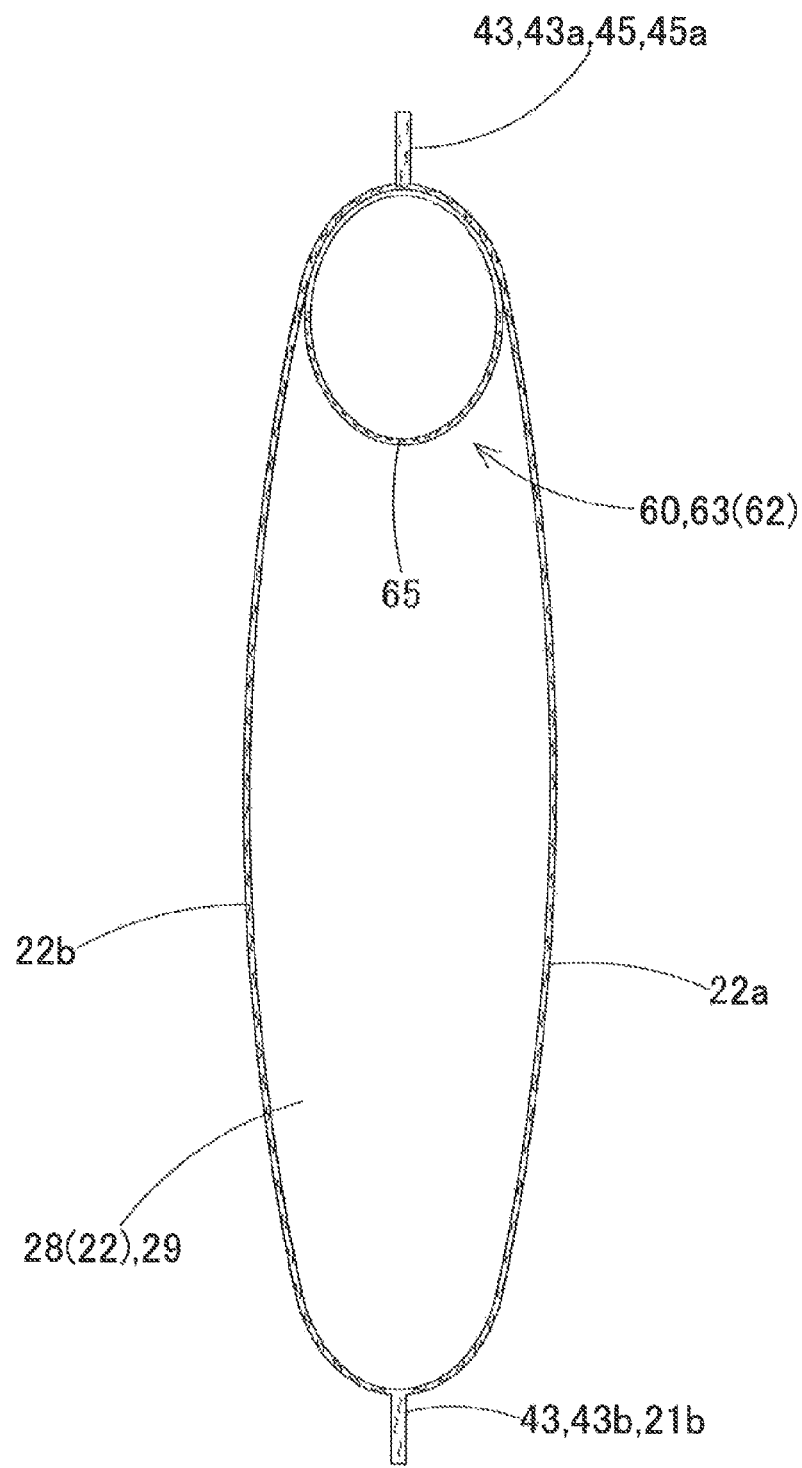
FIG. 5 is a schematic section of the airbag of FIG. 2 as inflated, taken along line V-V of FIG. 2.
Figure 12:
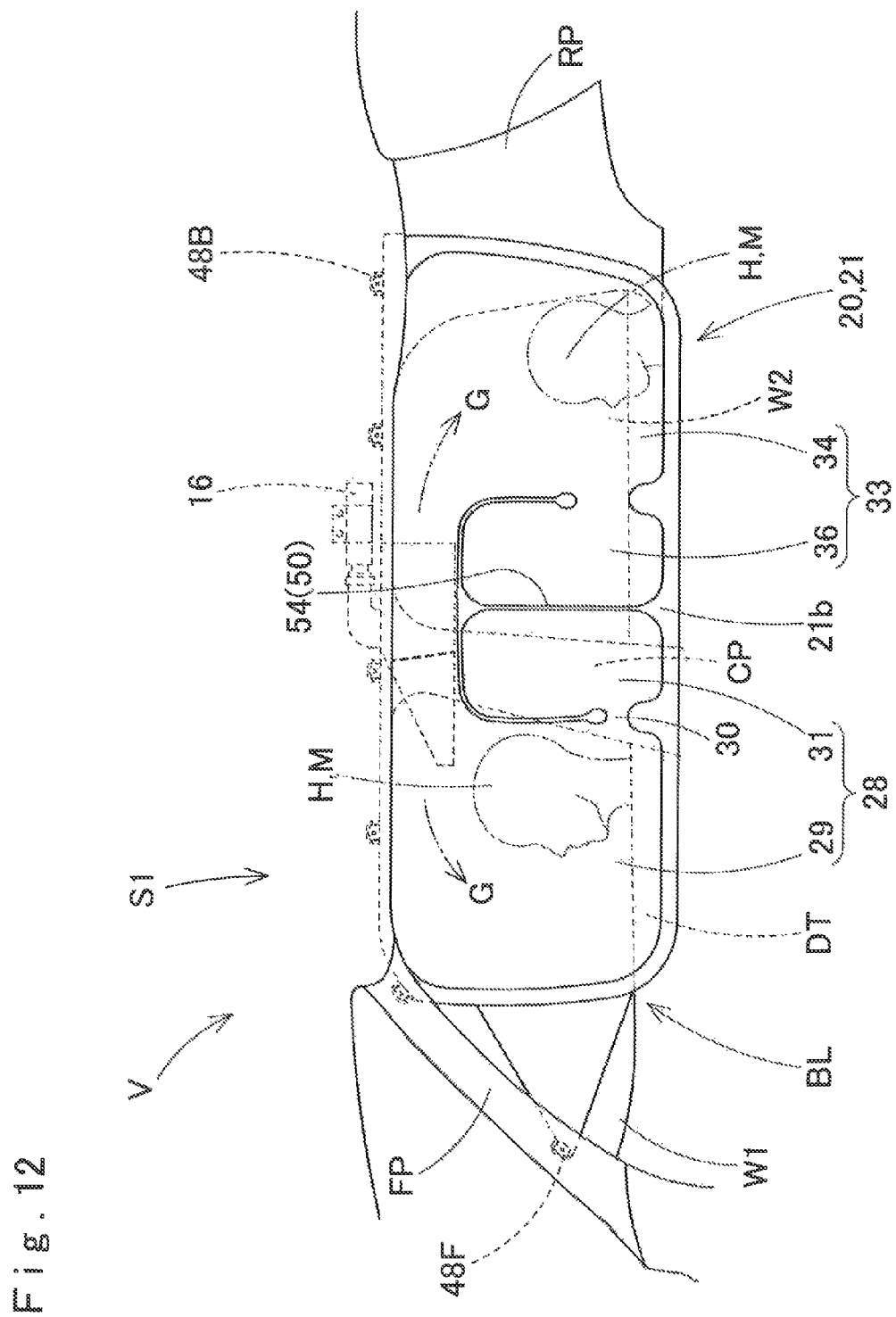
FIG. 12 is a front elevation of the head-protecting airbag apparatus of the first embodiment as fully inflated and viewed from an interior of a vehicle.

The airbag 20 is foldably flexible, and as shown in FIGS. 2 to 4, includes an airbag body 21 that is inflatable with an inflation gas G and an inner tube 60 that is located in an interior of the airbag body 21. The inner tube 60 lets out an inflation gas G fed from the inflator 16 to predetermined inflatable regions of the airbag body 21. As shown in FIGS. 1 and 12, when fed with an inflation gas G from the inflator 16, the airbag body 21 unfolds and covers inboard sides of the windows W1 and W2, the middle pillar CP and the rear pillar RP. Moreover, the airbag body 21 is configured such that its lower edge 21b is supported, at full deployment, by a part of the vehicle body structure (by a door trim, in the illustrated embodiment) DT at the belt line BL, which belt line BL extends along lower edges WD of the windows W1 and W2 on an inboard side of the vehicle.

Referring to FIGS. 2, 3 and 5 to 9, the airbag body 21 includes a gas admissive region 22 inflatable with an inflation gas G by separating an inboard side wall 22a and an outboard side wall 22b, and a non-admissive region 42 that admits no inflation gas G, in which non-admissive region 42 the inboard side wall 22a and outboard side wall 22b are attached together. Except the joint port 23 and a foremost mounting portion 48 (48F), the airbag 21 has a hollow-weave or one-piece woven construction of polyimide yarn, polyester yarn or the like.

The non-admissive region 42 includes a peripheral portion 43, mounting portions 48 and a closing portion 49. The peripheral portion 43 is arranged around the gas admissive region 22. The upper edge region 43a of the peripheral portion 43, which extends along the upper edge 21a of the airbag body 21, is comprised of a hollow-weave portion 45 and a bag joint 46. The hollow-weave portion 45 is a hollow-woven region, whereas the bag joint 46 is a region which is added by sewing or the like after hollow weaving. The hollow-weave portion 45 has a cut-open (or dividing) region 45c at the center in a front and rear direction, and a front region 45a and a rear region 45b that are respectively located in front of and at the rear of the cut-open (dividing) region 45c. The joint port 23 is located at the cut-open region 45c, in such a manner as to protrude upward, to be connected with the inflator 16 for introducing an inflation gas G into the airbag 20. In this specific embodiment, the joint port 23 is formed of a later-described gas upstream section 61 of the inner tube 60.

Figure 6:
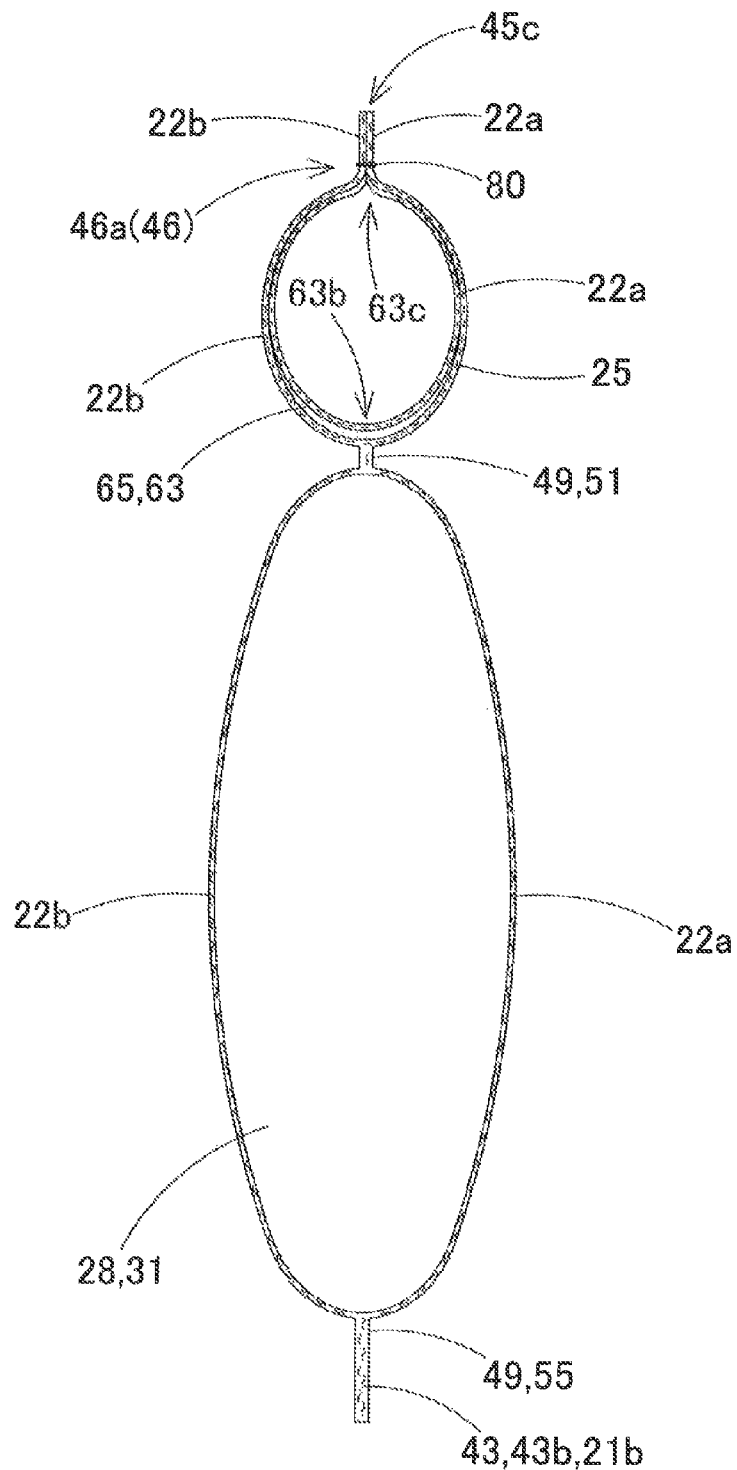
FIG. 6 is a schematic section of the airbag of FIG. 2 as inflated, taken along line VI-VI of FIG. 2.
Figure 7:
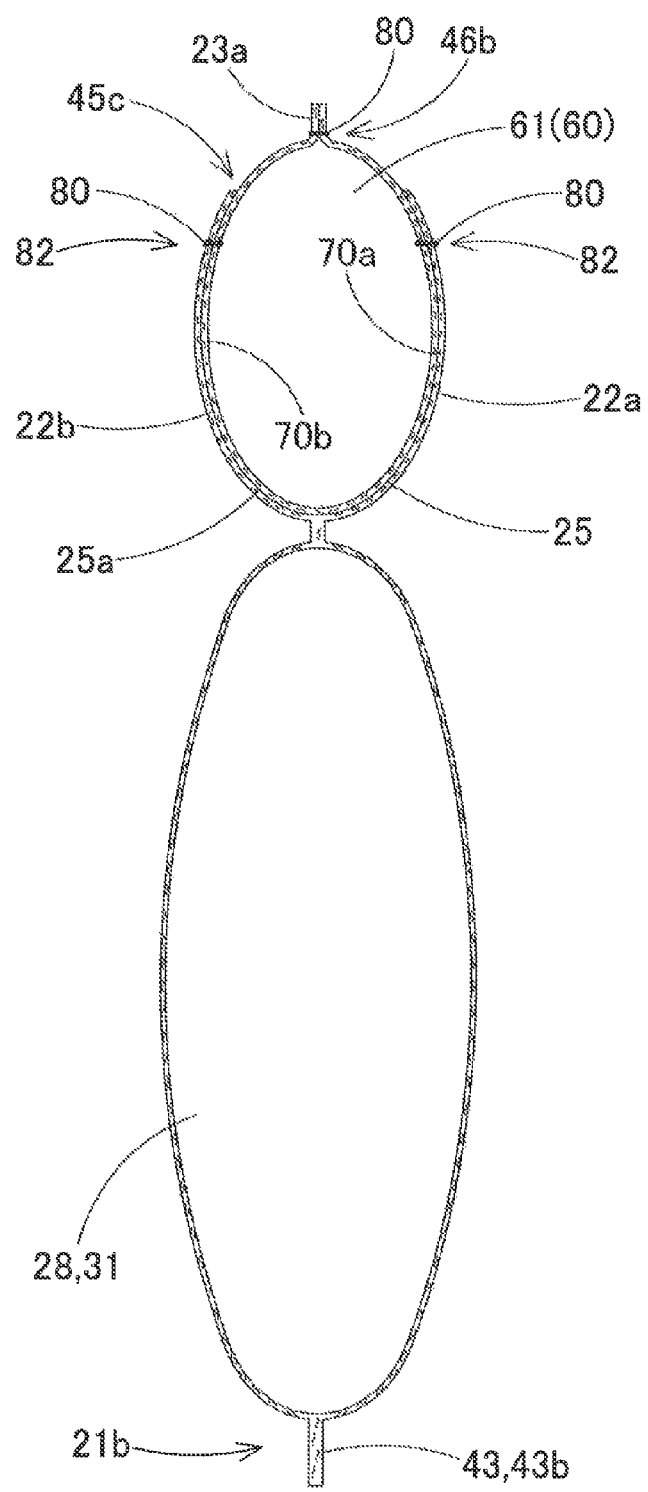
FIG. 7 is a schematic section of the airbag of FIG. 2 as inflated, taken along line VII-VII of FIG. 2.

The cut-open region 45c located between the front region 45a and rear region 45b of the hollow-weave portion 45 is closed up with the bag joint 46 that joins the inboard side wall 22a and the outboard side wall 22b together, and an inboard side wall 70a and an outboard side wall 70b of the inner tube 60 together, respectively (FIGS. 2, 6 and 7). The bag joint 46 is formed by sewing with sewing threads 80, and includes a front horizontal line 46a, a front oblique line 46b, a rear oblique line 46c, and a rear horizontal line 46d. The front horizontal line 46a extends rearward from the front region 45a of the hollow-weave portion 45 along a front and rear direction, and joins the inboard side wall 22a and outboard side wall 22b of the airbag body 21 together. The rear horizontal line 46d extends forward from the rear region 45b of the hollow-weave portion 45 in a front and rear direction, and joins the inboard side wall 22a and outboard side wall 22b of the airbag body 21 together.

The front oblique line 46b joins the front edge 23a of the joint port 23 together. It extends obliquely upward and rearward from the rear end of the front horizontal line 46a. The rear oblique line 46c joins the rear edge 23b of the joint port 23 together, and extends obliquely upward and rearward from the front end of the rear horizontal line 46d, The front oblique line 46b and rear oblique line 46c are formed by jointing outer circumferential edges of the inboard side wall 70a and outboard side wall 70b of the inner tube 60 which is comprised of a doubled sheet 70 for forming the inner tube 60, i.e., the joint port 23.

At the cut-open (dividing) region 45c between the front horizontal line 46a and rear horizontal line 46d, a tube joint 82 is formed with sewing threads 80 to join the inboard side wall 22a of the airbag body 21 and the inboard side wall 70a of the inner tube 60 together as well as the outboard side wall 22b of the airbag body 21 and the outboard side wall 70b of the inner tube 60 together, so as to prevent gas leakage from between the airbag body 21 and inner tube 60 (FIGS. 2 and 7).

The mounting portions 48 are formed in plurality in such a manner as to protrude upward from the upper edge 43a of the peripheral portion 43 at the upper periphery 21a of the airbag body 21. The airbag body 21 of the illustrated embodiment includes six such mounting portions 48. Each of the mounting portions 48 is provided with an aperture 48a for receiving the mounting bolt 14. As described above, each of the mounting portions 48 is coupled with the mounting bracket 13 and secured to the inner panel 2 by the mounting bolt 14 inserted through the aperture 48a and screwed into a screw hole of the inner panel 2.

A mounting portion 48F located at the front is formed on a separate cloth member made of a woven fabric of polyamide or the like and joined to the front edge 43c of the peripheral portion 43. The mounting portion 48F is secured to a vicinity of a lower region of the front pillar FP and helps exert a strong tension force on a lower peripheral region 21b of the airbag 20, more specifically on a line connecting the mounting portion 48F and a mounting portion 48 (48B) away from the front pillar FP, at airbag deployment, such that the airbag 20 can securely arrest an occupant M inside the vehicle (FIG. 12).

The closing portion (or partitioning portion) 49 is formed during hollow-weaving process of the airbag body 21 in such a manner as to go into the gas admissive region 22 and partition the gas admissive region 22. In this specific embodiment, the closing portion 49 includes a center partitioning portion 50, which is generally formed into a T a front lower extended portion 55 and a rear lower extended portion 56.

The center partitioning portion 50 includes a lower edge partitioning portion 51, which is a horizontal section of the "T" shape, and a vertical partitioning portion 54, which extends downward from the center in a front and rear direction of the lower edge partitioning portion 51 and continues to the lower edge 43b of the peripheral portion 43. The lower edge partitioning portion 51 defines the lower edge of a later-described bifurcate passage 25. The vertical partitioning portion 54 partitions a front window shield portion 28 and a rear window shield portion 33, both of which are inflatable region of the airbag body 21, as will be later described.

The center partitioning portion 50 further includes a front extended portion 52 extending downward from the front end of the lower edge partitioning portion 51, and a rear extended portion 53 extending downward from the rear end of the lower edge partitioning portion 51.

The front lower extended portion 55 extends upward from a part of the lower edge 43b of the peripheral portion 43 below the front extended portion 52, toward the front extended portion 52. The rear lower extended portion 56 extends upward from a part of the lower edge 43b of the peripheral portion 43 below the rear extended region 53, toward the rear extended portion 53. As will be described later, a space left between the front lower extended region 55 and the front extended region 52 serves as a communication passage 30 whereas a space left between the rear lower extended region 56 and the rear extended region 53 serves as a communication passage 35.

The gas admissive region 22 includes the joint port 23 connected to the inflator 16, a bifurcate passage 25 and a protection region 27. In the illustrated embodiment, the joint port 23 is comprised of an upper end region 61a of the gas upstream section 61 of the inner tube 60 only. However, it will also be appreciated to extend the inboard side wall 22a and outboard side wall 22b of the airbag body 21 in such a manner as to cover the gas upstream section 61 of the inner tube 60 and form the joint port 23 together with the gas upstream section 61.

The bifurcate passage 25 extends in a front and rear direction at the center in a front and rear direction of and along the upper edge 21a of the airbag body 21 at full deployment. More specifically, the bifurcate passage 25 is located between the upper edge 43a of the peripheral portion 43 and the lower edge partitioning portion 51 of the center partitioning portion 50.

The protection region 27 includes a front window shield portion 28 and a rear window shield portion 33 which are located respectively in a front region and in a rear region of and below the bifurcate passage 25. The vertical partitioning portion 54 of the center partitioning portion 50 partitions the front window shield portion 28 and the rear window shield portion 33. At airbag deployment, the front window shield portion 28 covers an inboard side of the window (front side window) W1, which is located at a side of the front seat of the vehicle V, and an inboard side of a part of the middle pillar CP, whereas the rear window shield portion 33 covers an inboard side of the window (rear side window) W2, which is located at a side of the rear seat and an inboard side of the rear pillar RP (FIGS. 1 and 12).

Each of the window shield portions 28 and 33 includes an inflatable main body 29/34 that shields the window W1/W2 for cushioning a head H of a vehicle occupant M, and a pressure control chamber 31/36, The pressure control chambers 31 and 36 are located proximate each other, more specifically in front of and at the rear of the vertical partitioning portion 54, in an adjoining fashion. Each of the pressure control chambers 31 and 36 is in gas communication with the inflatable main body 29/34 through a constricted communication passage 30/35. When the inflatable main body 29/34 gains in internal pressure, each of the pressure control chambers 31 and 36 absorbs an inflation gas G from the inflatable main body 29/34 via the communication passage 30/35 in order to restrain a pressure build-up in the inflatable main body 29/34.

As shown in FIGS. 2 and 4, the inner tube 60 includes the gas upstream section 61 and a gas outlet section 62 for emitting an inflation gas G fed from the gas upstream section 61. In this specific embodiment, the inner tube 60 is formed into an inverse T shape, i.e., a trifurcate shape. The gas upstream section 61 is formed into a tube and extends upward from a central region in a front and rear direction of the upper edge 21a of the airbag body 21, with its upper end region 61a opened. The gas outlet section 62 includes a front outlet section 63 and a rear outlet section 64 that bifurcate forward and rearward at the lower end 61b of the gas upstream section 61. As described above, the upper end region 61a of the gas upstream section 61 serves as the joint port 23 for connection with the inflator 16 and therefore, the gas upstream section 61 is located in an upstream region of an inflation gas G when the inflator 16 is in service.

The front outlet section 63 and rear outlet section 64 of the gas outlet section 62 are located in a downstream region of an inflation gas G, relative to the gas upstream section 61, and both are located inside the bifurcate passage 25. Leading ends of the front and rear outlet sections 63 and 64 serve as outlet ports 62a of an inflation gas G. Each of the outlet ports 62a is located at an inlet port 28a/33a of the front window shield portion 28/rear window shield portion 33, which inlet ports 28a and 33a being respectively positioned proximate the front and rear ends of the lower edge partitioning portion 51. In this specific embodiment, an outer diameter GD (FIG. 10A) of each of the front outlet section 63 and rear outlet section 64 is so determined that outer circumferential surfaces of the front outlet section 63 and rear outlet section 64 contact an inner circumferential surface 25a of the bifurcate passage 25 generally wholly when inflated.

Figure 10A:
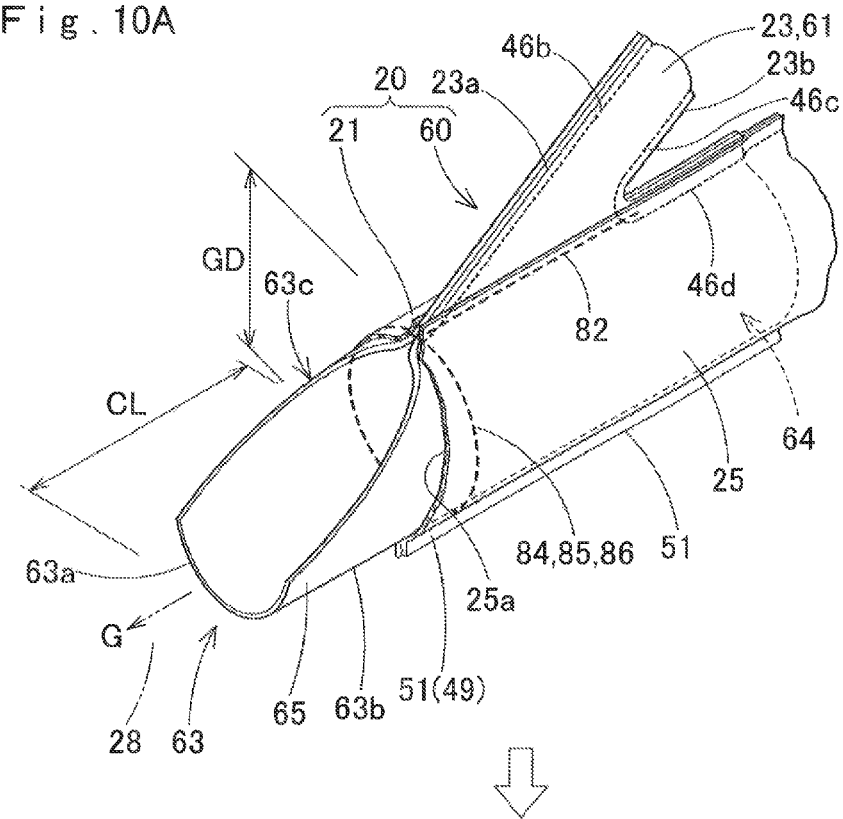
FIG. 10A is a partial broken perspective view of a check valve section of the inner tube in the first embodiment, as is open.

The front outlet section 63 is so formed as to narrow toward the front end 63a. As shown in FIG. 10A, whereas the lower edge 63b of the front outlet section 63 is continuous in a circumferential direction, the upper edge 63c is split.

Figure 8:
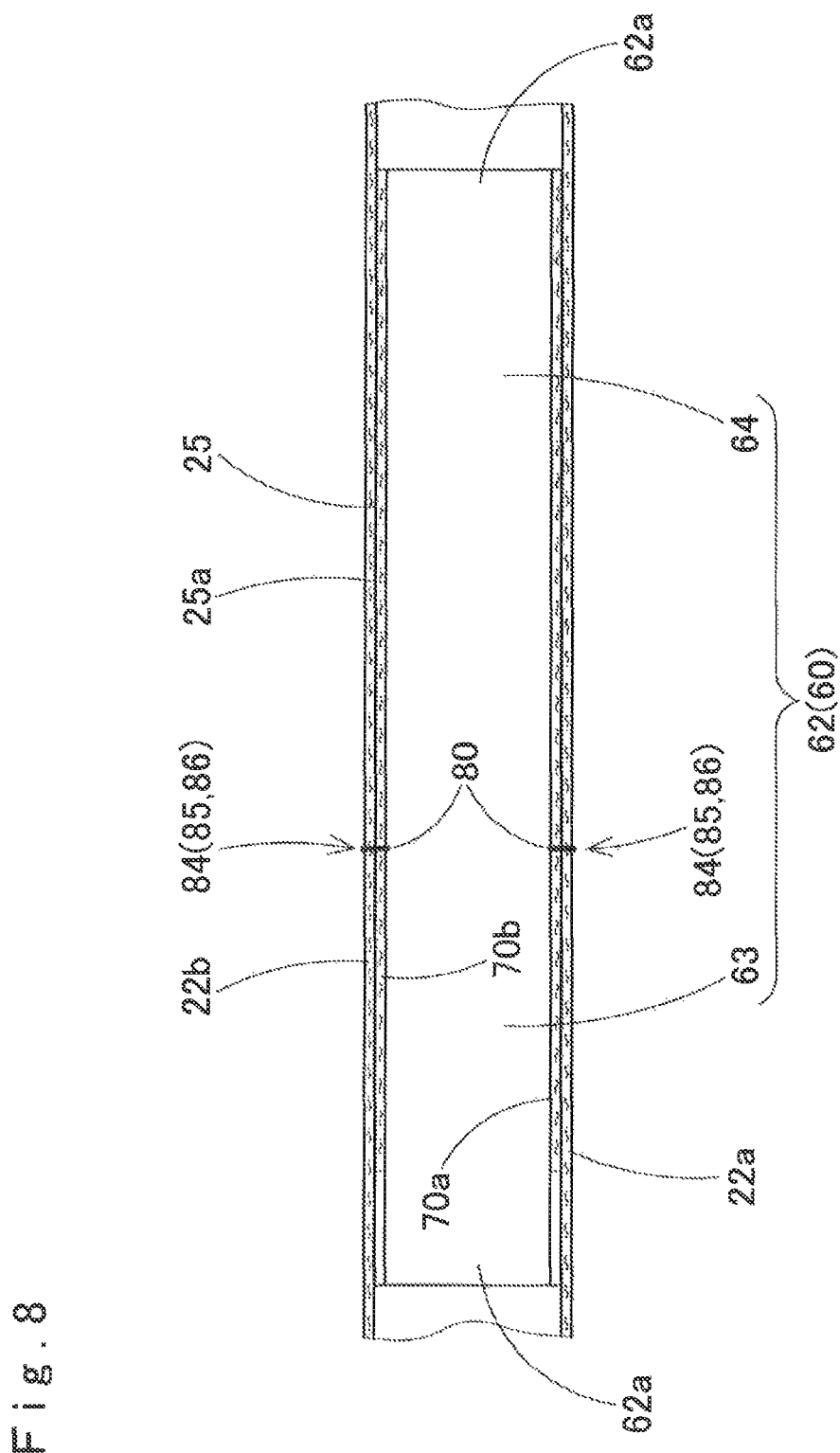
FIG. 8 is a schematic section of the airbag of FIG. 2 as inflated, taken along line VIII-VIII of FIG. 2.

As shown in FIGS. 2 and 8, an entire gas outlet section 63 serves as a check valve section 65. The check valve section 65 is jointed with the inboard side wall 22a and outboard side wall 22b of the airbag body 21 with sewing threads 80, at a region toward the gas upstream section 61 and wholly in a circumferential direction, thus forming a valve joint 84.

The length CL (FIG. 10A) between the valve joint 84 and the front end 63a of the front outlet section 63 is so determined that, when the inflator 16 has finished discharging an inflation gas G, the check valve section 65 folds back toward the gas upstream section 61, due to an internal pressure of the front window shield portion 28, so as to close off the gas outlet section 63.

As described above, the outer diameter GD (FIG. 10A) at the location of the valve joint 84 is so determined that the outer circumferential surface of that region contacts the inner circumferential surface 25a of the bifurcate passage 25 generally wholly when inflated. Further, the upper end 84a of the vale joint 84 intersects with the front horizontal line 46a of the bag joint 46 at the upper edge region 43a of the peripheral portion 43 (i.e., the non-admissive region 42), whereas the lower end 84b intersects with the lower edge partitioning portion 51 (i.e., the non-admissive region 42). In the illustrated embodiment, the vale joint 84 is formed into a straight line which is so slanted that the upper end 84a is located more forward than the lower end 84b.

Further, as described above, in a vicinity of the lower end 61b of the gas upstream region 61 of the inner tube 60, the tube joint 82 join or sew the inboard side wall 22a of the airbag body 21 and the inboard side wall 70a of the inner tube 60 together as well as the outboard side wall 22b of the airbag body 21 and the outboard side all 70b of the inner tube 60 together, so as to prevent gas leakage from between the front horizontal line 46a and the rear horizontal line 46d at the upper edge region 43a of the peripheral portion 43 in the airbag body 21 (FIGS. 2 and 7).

As shown in FIG. 4A, the inner tube 60 is comprised of an inner tube sheet 70 formed of a woven fabric of polyamide or the like and having a triangular shape. The inner tube 60 is formed by doubling the inner tube sheet 70 on a horizontal crease 71, which crease corresponding to the lower edge 60c of the inner tube 60, such that the inboard side wall 70a and outboard side wall 70b lie one above the other, and then by joining or sewing together the front upper edges 60a and rear upper edges 60d of the inboard side wall 70a and outboard side wail 70b, respectively, with sewing threads 80. These sewn regions constitute the front oblique line 46b and rear oblique line 46c of the bag joint 46.

Manufacturing of the inner tube 60 and airbag 20 is now described. The airbag body 21 is firstly cut up after hollow-weaving and formed into a figure shown in FIG. 3. Then the cut-open region 45c is opened and an area of the inner tube sheet 70 around the crease 71 is entered into the bifurcate passage 25 therethrough, and the inboard side wall 70a and outboard side wall 70b of the inner tube sheet 70 are jointed to the inboard side wall 22a and outboard side wail 22b of the airbag body 21 with sewing threads 80, respectively, thereby forming the tube joint 82 and the valve joint 84.

Thereafter, the inner tube sheet 70 is folded on the crease 71 such that the inboard side wall 70a and outboard side wall 70b lie one above the other, while the cut-open region 45c is closed, The airbag body 21 is then flattened such that the inboard side wall 22a and outboard side all 22b are overlaid one above the other.

Subsequently, the inboard side wall 22a and outboard side all 22b of the airbag body 21 as well as the inboard side wall 70a and outboard side wall 70b are respectively sewn together with sewing threads 80, thus forming the front horizontal line 46a, the front oblique line 46b, the rear oblique line 46c, and the rear horizontal line 46d of the bag joint 46. Thus the airbag 20 is manufactured, The cloth member (FIG. 2) having the foremost mounting portion 48F may be connected to the front edge 43c of the airbag body 21 immediately after cutting process after hollow-weaving or after forming the bag joint 46.

Mounting of the head-protecting airbag apparatus S1 on a vehicle V is now described. Firstly, the airbag 20 is folded up from a flattened state by bringing the lower edge region 21b close to the upper edge 21a having the mounting portions 48. Then a breakable wrapping member (not shown) is wound around the airbag 20 for keeping the folded-up configuration, The folding of the airbag 20 is comprised of a bellows-folding applied to the upper edge region 21a including the bifurcate passage 25 and a rolling applied to an area therebelow.

Subsequently, the inflator 16 with the mounting bracket 17 mounted thereon is connected with the joint port 23 of the airbag 20, and the mounting brackets 13 are attached to the mounting portions 48 of the airbag 20, thereby forming an airbag module, Thereafter, the mounting portions 48 with the mounting brackets 13 are located on and fastened to mounting positions on the inner panel 2 of the vehicle body structure 1 by inserting the mounting bolts 14 into the mounting holes 48a and screw holes on the inner panel 2. Further, the inflator 16 is secured to the inner panel 2 by fixing the mounting bracket 17 with the bolts 18, thus the airbag module is mounted on the vehicle body structure 1. Then the inflator 16 is connected with a not-shown lead wire extending from a suitable control for actuating the inflator. If then the front pillar garnish 4, the roof head liner 5, the middle pillar garnish 7 and the rear pillar garnish 8 are attached to the vehicle body structure 1, the head-protecting airbag apparatus S1 of the first embodiment is mounted on the vehicle V.

When the head-protecting airbag apparatus S1 mounted on the vehicle V is actuated upon a side impact crash, the inflator 16 discharges an inflation gas G and the gas G flows through the gas upstream section 61 of the inner tube 60 and reaches the front outlet section 63 and rear outlet section 64 of the gas outlet section 62. Then the gas G flows out of the front and rear outlet sections 63 and 64 into the front window shield portion 28 and rear window shield portion 33 of the airbag body 21 as indicated by double-dotted lines in FIG. 2, thus inflating the airbag body 21. Although the front outlet section 63 of the gas outlet section 62 is provided with the check valve section 65, the check valve section 65 is formed into a flexible tube that extends and opens toward the front window shield portion 28 when pushed by the gas G as shown in FIGS. 2 and 10A. Therefore the gas G will reach the front window shield portion 28 smoothly.

Figure 10B:
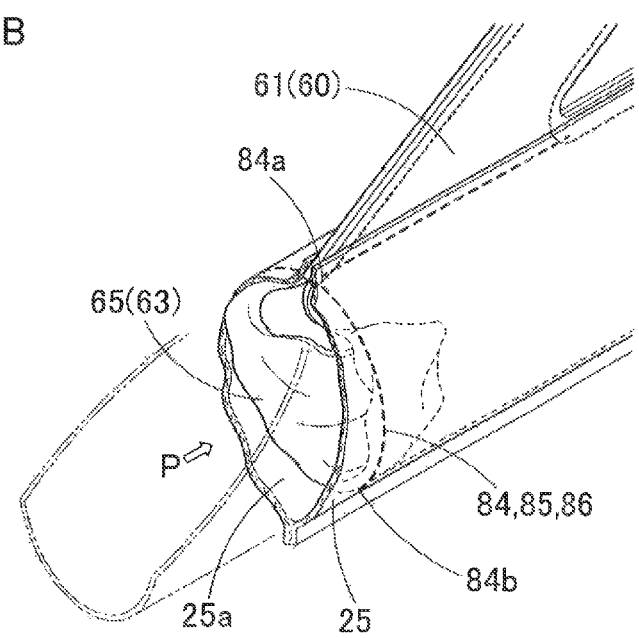
FIG. 10B is a partial broken perspective view of the check valve section of FIG. 10A, as closes off a gas outlet section.
Figure 11:
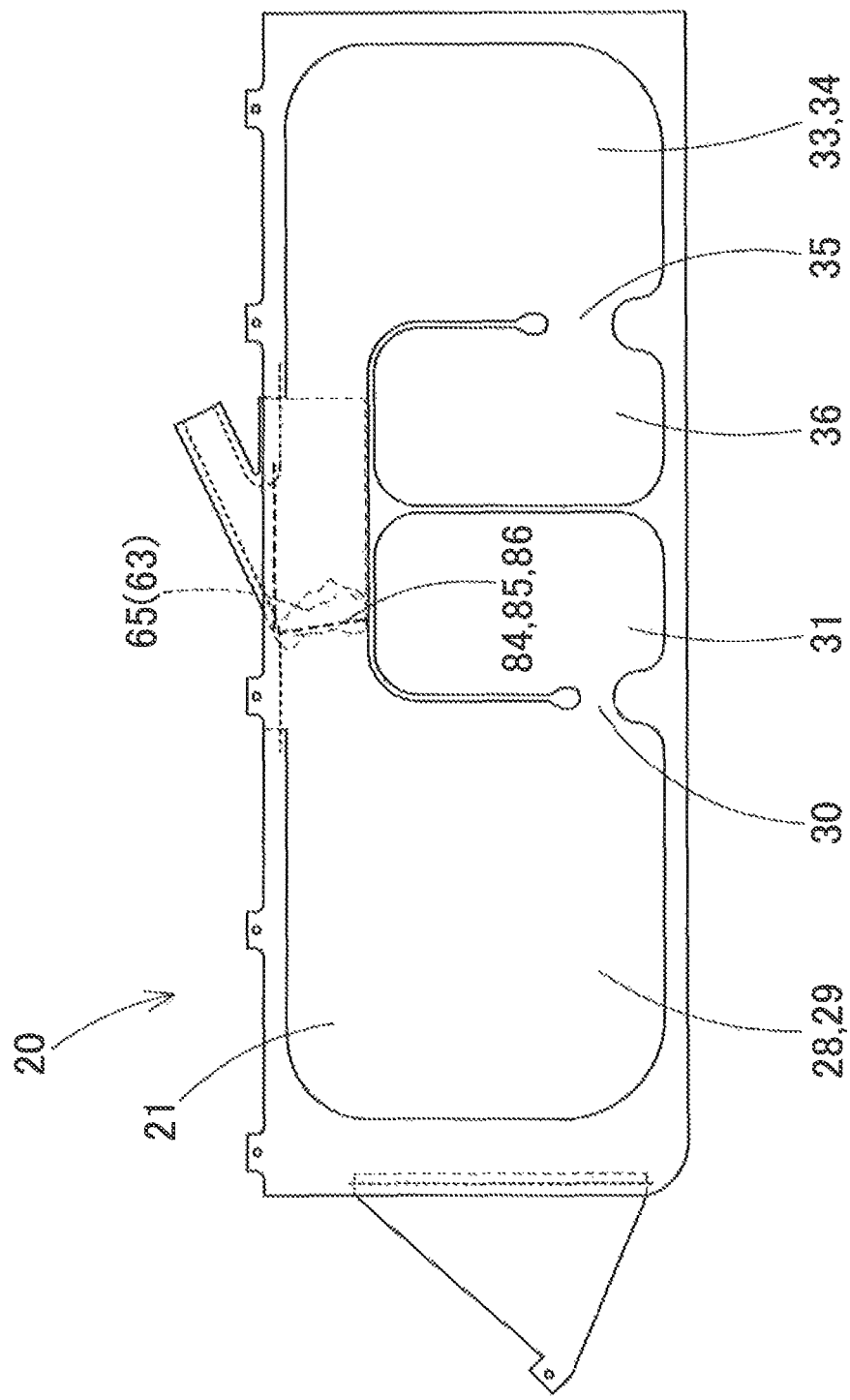
FIG. 11 is a front elevation of the airbag of FIG. 2 as the check valve section closes off the gas outlet section.

When the inflator 16 finishes discharging the inflation gas G, the protection region 27 has a higher pressure relative to the gas upstream section 61 which is located on a side of the inflator 16. Then the check valve section 65, which had a generally tubular shape, will fold back or be pushed back toward the inner tube 60 due to an internal pressure P of the inflated front window shield portion 28 as shown in FIGS. 10B and 11, and eventually close off the front outlet section

63. Thus the inflation gas G will be prevented from flowing back toward the inner tube 60 from the front window shield portion 28.

That is, the airbag 20 can be provided with a check valve mechanism by simply forming the check valve section 65 with a flexible, tubular shape and a predetermined length, on the front outlet section 63 of the inner tube 60 for feeding an inflation gas G to the front window shield portion 28 of the airbag body 21. This check valve section 65 is simply formed into a generally tubular shape extending and opening toward the front window shield portion 28 when letting out an inflation gas. Accordingly the check valve section 65 will not form a resistance to gas flow and allow an inflation gas G to be smoothly delivered into the front window shield portion 28.

Therefore, the head-protecting airbag apparatus S1 according to the first embodiment of the invention is capable of inflating the airbag 20 quickly and checking the backflow of an inflation gas G smoothly.

In the first embodiment, the front outlet section 63 of the inner tube 60, which outlet section 63 being provided with the check valve section 65, is jointed with the airbag body 21 with the valve joint 84 at a region toward the gas upstream section 61 and in a vicinity of the check valve section 65.

With this configuration, when the check valve section 65 is pushed back toward the inner tube 60 and closes off the front outlet section 63 due to stopping of gas supply, the check valve section 65 will fold back on the valve joint 84, and will not fold back further than that position. That is, the check valve section 65 will have a steady position to suppress backflow of an inflation gas G. Accordingly, the inflated front window shield portion 28 of the airbag body 21 will have a steady volume and a steady internal pressure. That is, the valve joint 84 functions as a fold restrictor 85 that restricts a position on which the check valve section 65 folds.

In the first embodiment, moreover, the airbag body 21 includes the gas admissive region 22 that is inflatable with an inflation gas G by separating the inboard side wall 22a and the outboard side wall 22b, and the non-admissive region 42 that admits no inflation gas G with the inboard side wall 22a and outboard side wall 22b attached together. The gas admissive region 22 includes a plurality of inflatable regions partitioned by the non-admissive region 42 (i.e., the front window shield portion 28 and rear window shield portion 33) and the bifurcate passage 25 that is in gas communication with the inflatable regions (the front window shield portion 28 and rear window shield portion 33) and is provided with the inner tube 60. Further, the inner tube 60 includes a plurality of gas outlet sections (i.e., the front outlet section 63 and the rear outlet section 64) that are located in the bifurcate passage 25 for streaming an inflation gas G respectively to the inflatable regions (the front window shield portion 28 and rear window shield portion 33). In addition, the front outlet section 63 is provided with the check valve section 65.

With this configuration, when an inflation gas G fed from the inflator 16 reaches and inflates the inflatable regions of the airbag body 21 (i.e., the front window shield portion 28 and rear window shield portion 33) via the gas outlet sections 63 and 64 of the inner tube 60 and the inflator 16 stops discharging the inflation gas G, the check valve section 65 closes off the front outlet section 63. Then the inflation gas G in the front window shield portion 28 will not escape to the other inflatable region, i.e., to the rear window shield portion 33. That is, the closed front window shield portion 28 will be prevented from losing its internal pressure as much as possible, thereby keeping a desired internal pressure for cushioning a head H of a vehicle occupant M securely, after the inflator 16 finishes supplying the inflation gas G.

In the first embodiment, furthermore, the outer diameter GD of the front outlet section 63 of the inner tube 60 at the location of the valve joint 84 (the joint that connects the front outlet section 63 and the airbag body 21) is such a dimension that enables the front outlet section 63 to inflate integrally with the bifurcate passage 25 at that location. In addition, the valve joint 84 is so formed as to extend up to the non-admissive region 42 (i.e., up to the front horizontal line 46a and to the lower edge partitioning portion 51) surrounding the bifurcate passage 25.

This configuration will shut off the bifurcate passage 25 where the front outlet section 63 is located as well when the check valve section 65 closes off the front outlet section 63. If the bifurcate passage 25, which communicates the front window shield portion 28 and the rear window shield portion 33, will be closed, escape of the inflation gas G from the front window shield portion 28 to the rear window shield portion 33 will be further suppressed.

That is, since the valve joint 84 joints a whole circumference of the front outlet section 63 to an entire inner surface 25a in a circumferential direction of the bifurcate passage 25, the valve joint 84 forms a passage closing joint 88 that helps close off the front outlet section 63 and the bifurcate passage 25 together when the check valve section 65 is in service.

As a result, after the inflator 16 finishes discharging inflation gas, the front window shield portion 28 having the check valve section 65 will maintain a desired internal pressure for cushioning a head H of a vehicle occupant M even more securely.

In the first embodiment, moreover, the front window shield portions 28 having the check valve section 65 includes the inflatable main body 29 and the pressure control chamber 31 that is in gas communication with the inflatable main body 29 via the constricted passage 30 and absorbs an inflation gas G from the inflatable main body 29 via the passage 30 in order to restrain a pressure build-up in the inflatable main body 29.

With this configuration of the first embodiment, when the inflatable main body 29 is thrown against an occupant's head H, the pressure control chamber 31 will absorb an inflation gas G from the inflatable main body 29 and prevent a rapid pressure build-up of the inflatable main body 29 of the front window shield potion 28 which would otherwise be caused by the blocking of the gas passage, thereby adequately cushioning the occupant's head H.

In the meantime, since the inflation gas G in the inflatable main body 29 will escape only to the pressure control chamber 31, but not to the rear window shield portion 33 due to blocking by the check valve section 65, the inflatable main body 29 will be adequately controlled in internal pressure in catching an occupant's head H.

In the first embodiment, furthermore, the airbag apparatus S1 is designed as a head-protecting airbag apparatus and the airbag 20 is a curtain airbag configured to cover inboard sides of the windows W1 and W2 disposed side by side on a lateral of the vehicle V. The airbag body 21 includes the bifurcate passage 25 that is so arranged to extend in a front and rear direction along the upper edge 21a of and in a vicinity of a center in a front and rear direction of the airbag body 21 as deployed, and the front window shield portion 28 and the rear window shield portion 33 that are located in front of at the rear of the bifurcate passage 25 and are in gas communication with the bifurcate passage 25 for covering the front and rear windows W1 and W2, The inner tube 60 includes the gas upstream region 61 that is located proximate the upper edge 21 a of and in a vicinity of the center in a front and rear direction of the airbag body 21 in such a manner as to extend upward for connection with the inflator 16 and the gas outlet section 62. Further, the gas outlet section 62 includes the front outlet section 63 and the rear outlet section 64 that bifurcate forward and rearward at the lower end 61*b* of the gas upstream section 61 and located inside the bifurcate passage 25.

With this configuration, with a so-called center-arranged inflator 16 that is located at an upper region of and in a vicinity of a center in a front and rear direction of the airbag 20 having a front window shield portion 28 and a rear window shield portion 33 at a front region and a rear region thereof, the lower end 61 b of the inner tube 60, which extends downward from the gas upstream region 61, has the front outlet section 63 and the rear outlet section 64 bifurcating forward and rearward inside the bifurcate passage 25. This configuration will reduce gas stream lengths from the inflator 16 to the front and rear window shield portions 28 and 33, thereby decreasing the time from initiation to completion of the airbag inflation. Coupled with the configuration of the check valve section 65 not increasing flow resistance, this configuration will be suitable for a curtain airbag which is required to complete inflation in a short time. In addition, this configuration will help reduce the size of the airbag 20 in a folded-up configuration since the inner tube 60 can be short in a front and rear direction.

Figure 13:
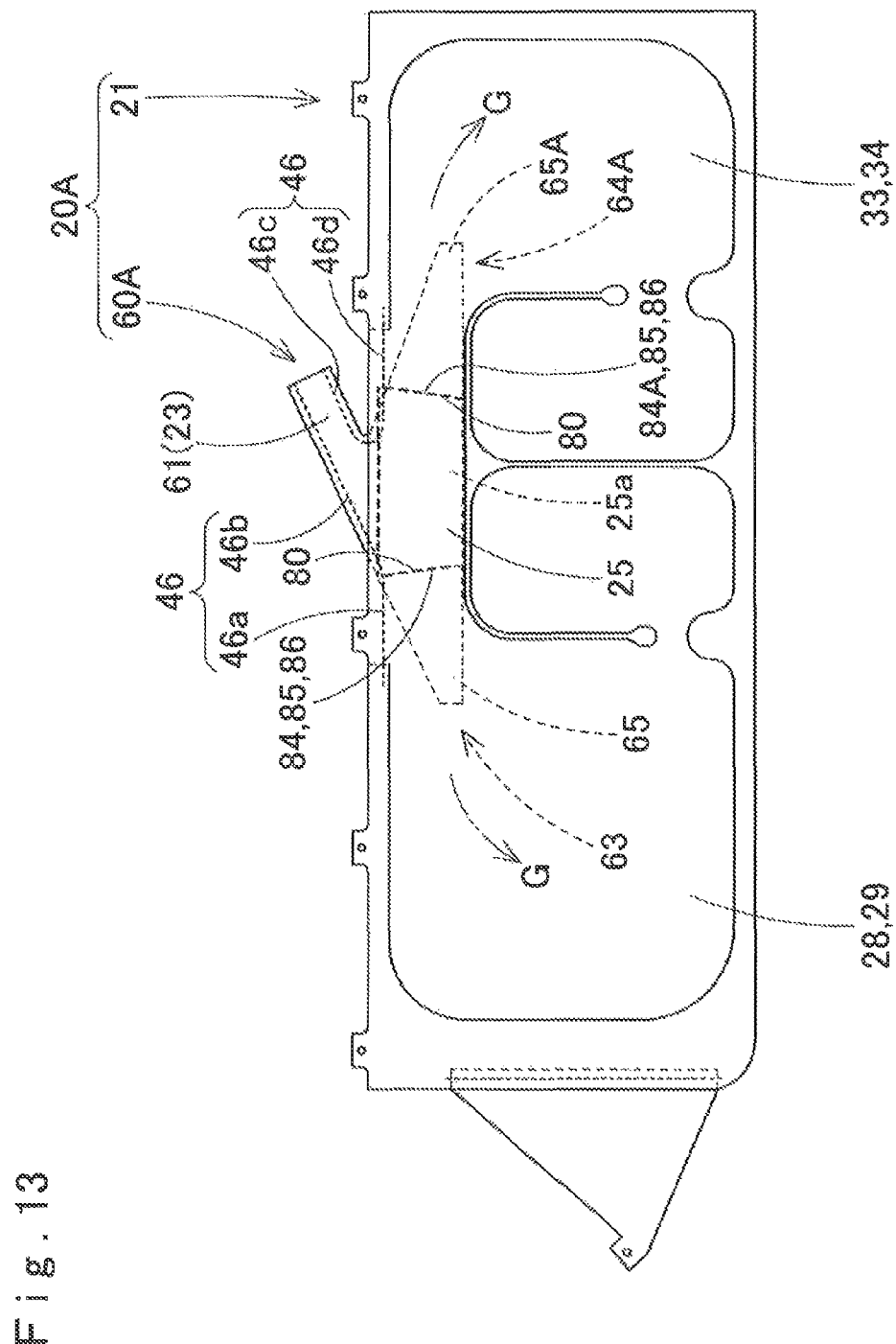
FIG. 13 is a front elevation of a modification of an airbag according to the first embodiment.
Figure 14:
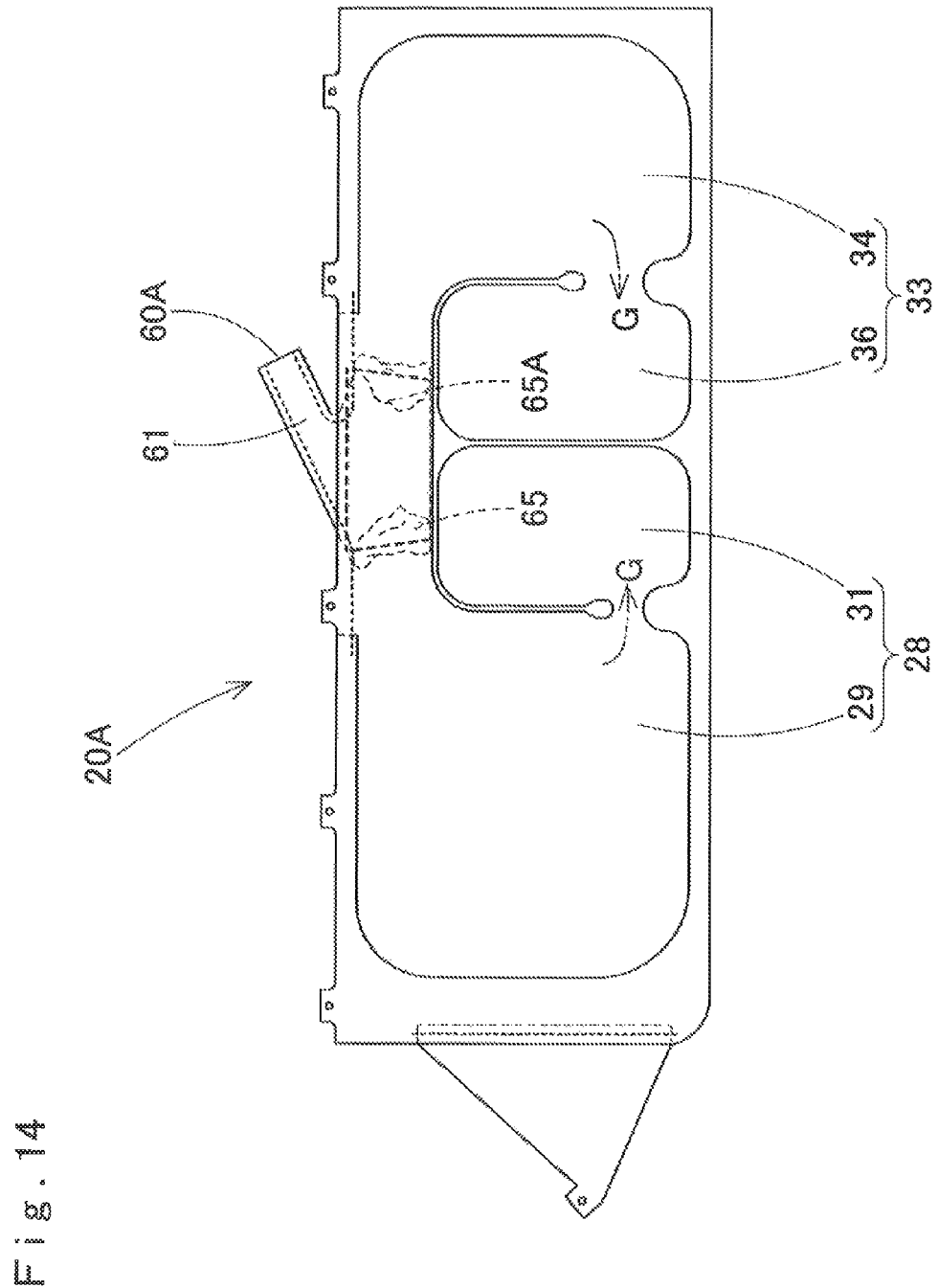
FIG. 14 is a front elevation of the airbag of FIG. 13 in which a front outlet section and a rear outlet section of the inner tube are closed.

Although the inner tube 60 of the first embodiment has the check valve section 65 only on the front outlet section 63, as in an airbag 20A shown in FIGS. 13 and 14, a check valve section 65A may also be formed on the rear outlet section 64A. The check valve section 65A has a symmetrical configuration to the check valve section 65 formed on the front outlet section 63 in the first embodiment, and is jointed to the inner circumferential surface 25*a* of the bifurcate passage 25 with a valve joint 84A formed similarly to the valve joint 84.

The airbag 20A has a similar structure to the airbag 20 except that the rear outlet section 64A is provided with the check valve section 65 jointed to the airbag body 21 with the valve joint 84A. The airbag 20A is to be assembled with the inflator 16 or the like for use in a head-protecting airbag apparatus, as the airbag 20.

With the airbag apparatus with the airbag 20A, both of the front outlet section 63 and rear outlet section 64A of the inner tube 60A are provided with the check valve sections 65/65A, respectively. Accordingly, when the inflator finishes discharging an inflation gas G, each of the check valve sections 65/65A will close off the front window shield portion 28 and rear window shield portion 33 as shown in FIG. 14 and prevent respective internal pressures from moving to other regions of the airbag, thus each of the front window shield portion 28 and rear window shield portion 33 will maintain desired internal pressures for cushioning an occupant's head.

In the airbag 20A, moreover, each of the front window shield portion 28 and rear window shield portion 33 includes the pressure control chamber 31/36 in addition to the inflatable main body 29 and 34. After airbag inflation, with this configuration, inflation gasses G in the inflatable main bodies 29 and 34 will escape only to the pressure control chambers 31 and 36, but not to the rear window shield portion 33 or to the front window shield portion 28 due to blocking by the check valve sections 65 and 65A. Therefore each of the inflatable main bodies 29 and 34 will be adequately controlled in internal pressure when catching an occupant's head H.

Figure 15:
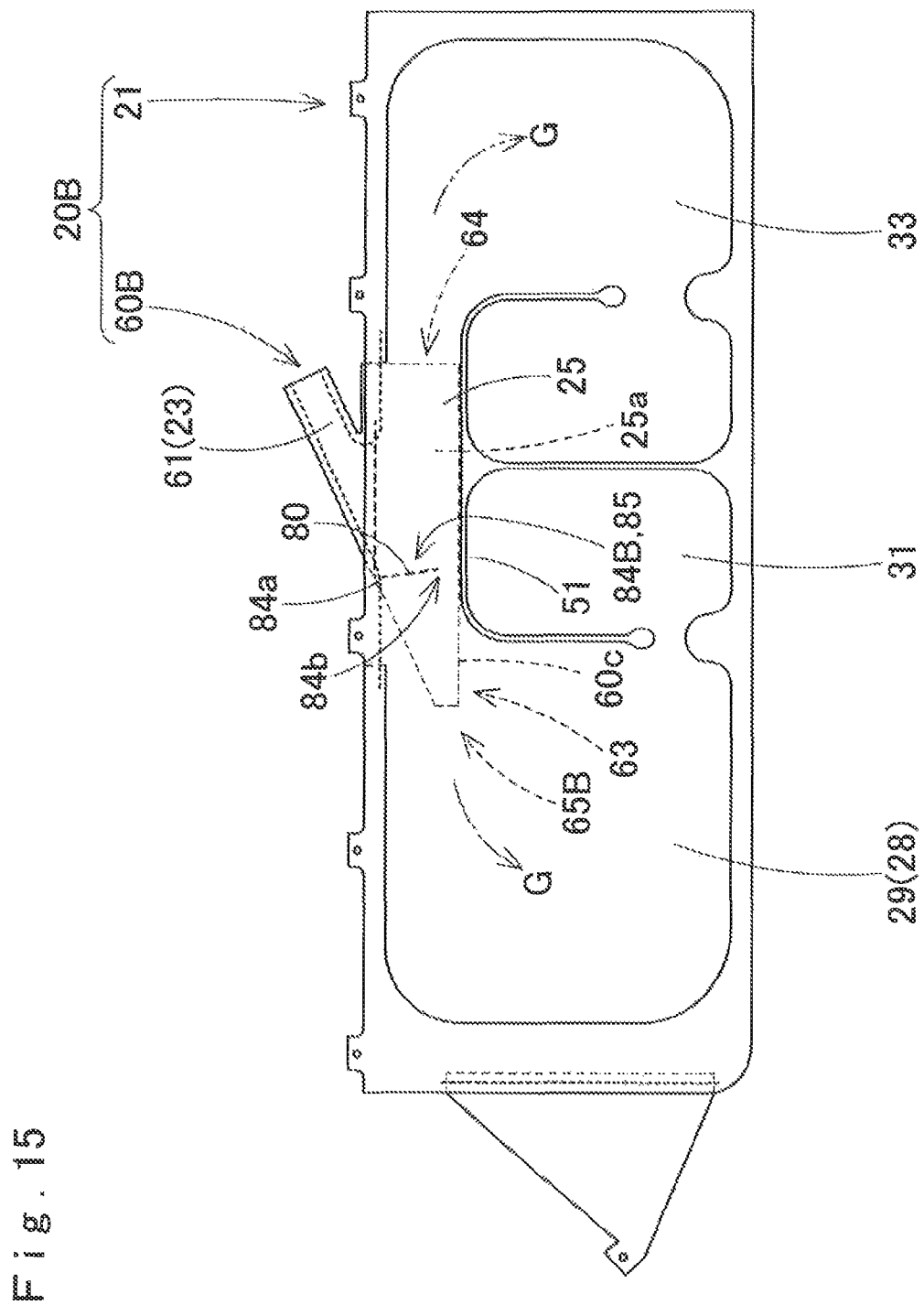
FIG. 15 is a front elevation of yet another modification of an airbag according to the first embodiment.
Figure 17A:
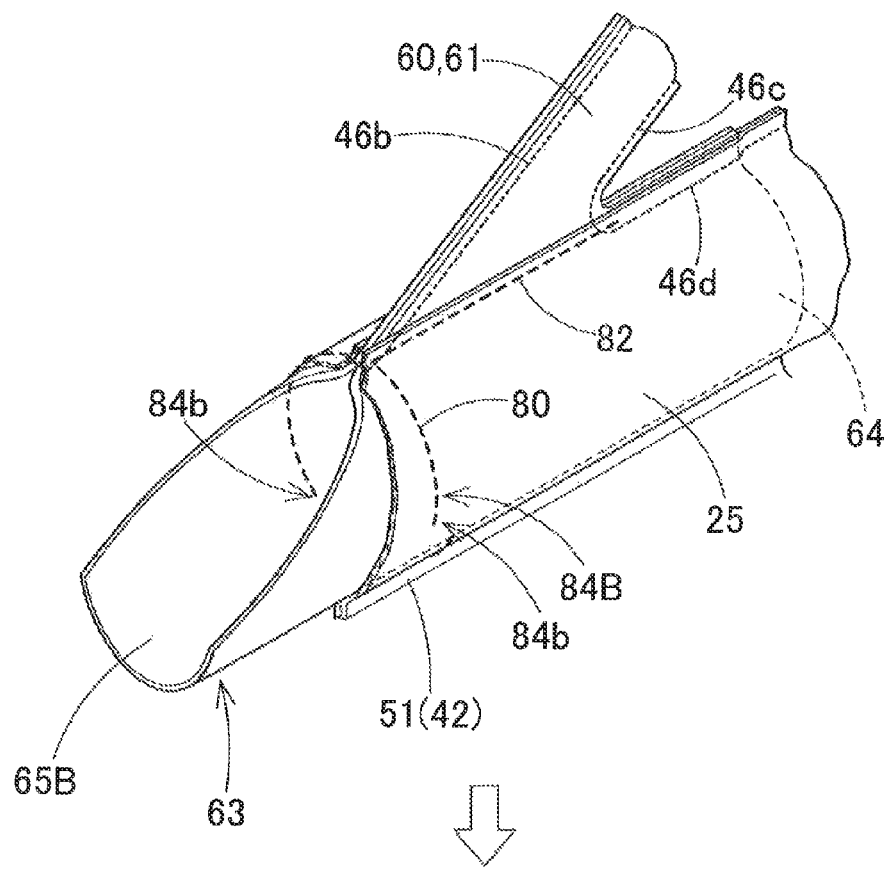
FIG. 17A is a partial broken perspective view of a check valve section of an inner tube of the airbag of FIG. 15, as is open.

In the first embodiment, the valve joint 84 of the inner tube 60 is so formed as to intersect with the lower edge partitioning portion 51 of the non-admissive region 42 at the lower end 84*b*. However, the valve joint may also be configured as a valve joint 84B in an airbag 20B shown in FIGS. 15 to 17. The valve joint 84B joints an inner tube 60B to the inner circumferential surface 25*a* of the bifurcate passage 25, but the lower end 84*b* of the valve joint 84B is separately located above the lower edge partitioning portion 51.

Figure 17B:
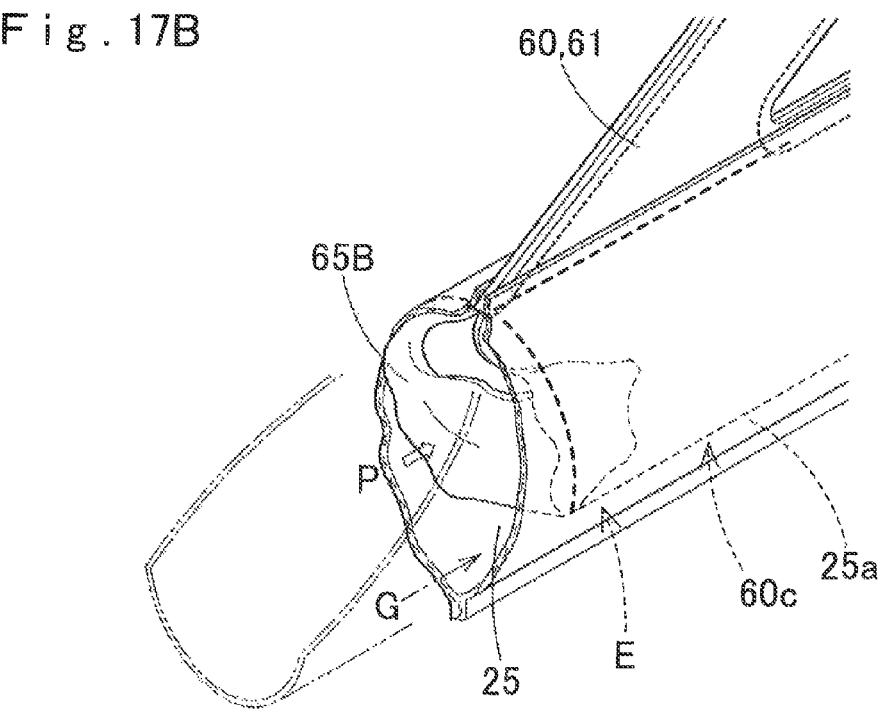
FIG. 17B is a partial broken perspective view of the check valve section of FIG. 17A, as closes off the front outlet section.
Figure 18A:
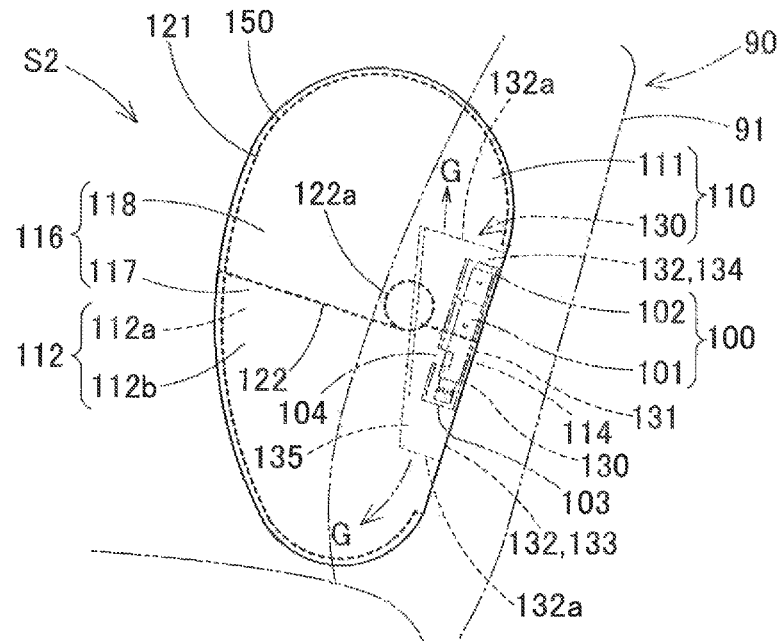
FIG. 18A is a front elevation of an airbag of an airbag apparatus according to a second embodiment of the invention, as inflated.
Figure 18B:
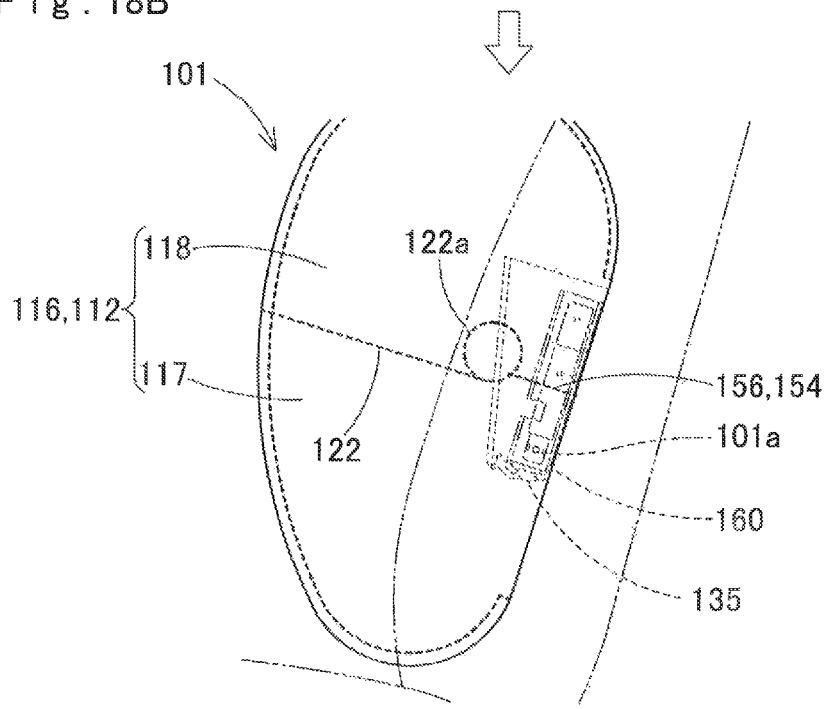
Figure 19A:
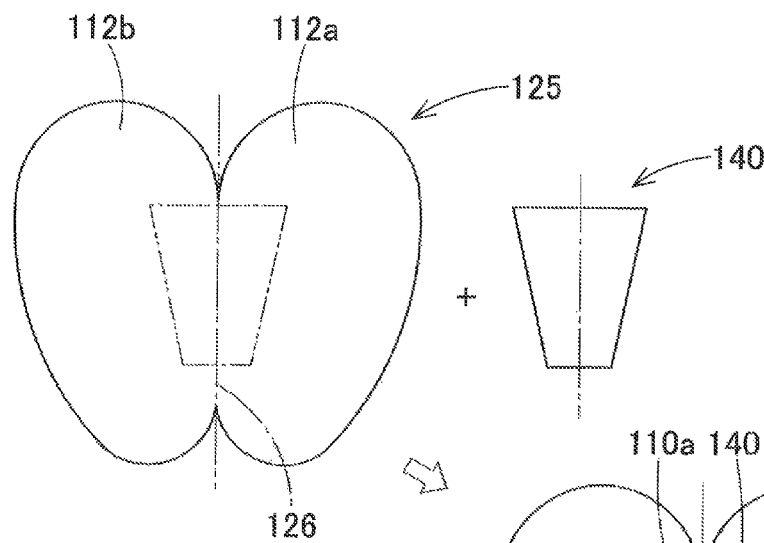
FIGS. 19A to 19D illustrate a manufacturing process of the airbag of the second embodiment.
Figure 19C:
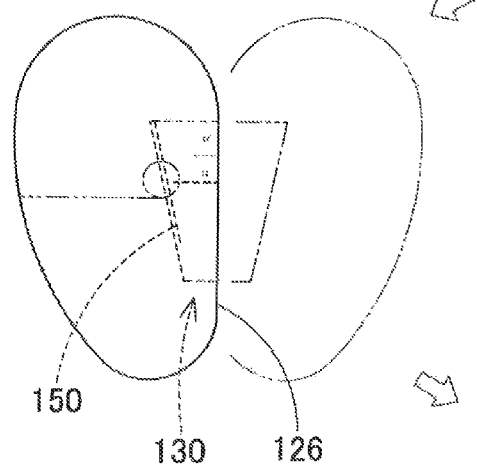
Figure 19B:
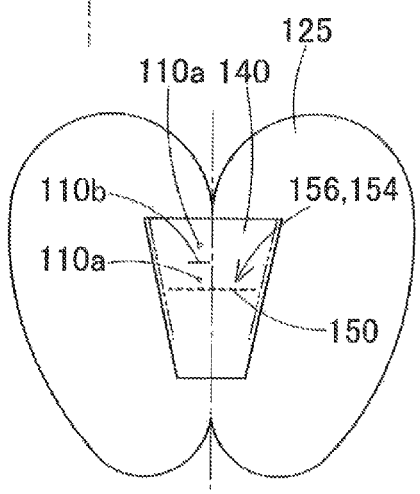
Figure 19D:
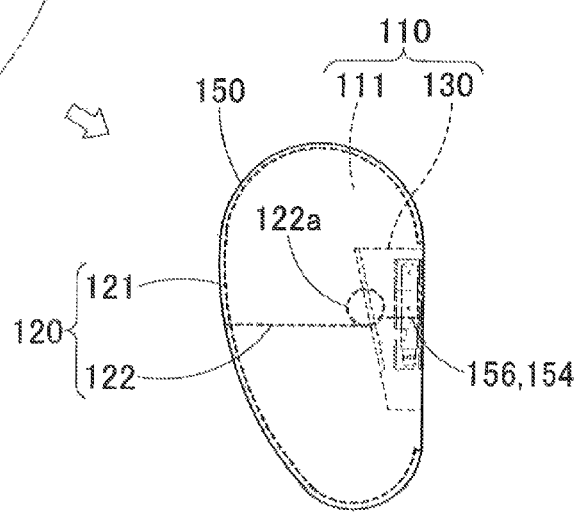

With this configuration, when the inflator stops discharging an inflation gas G, the check valve section 65B of the front outlet section 63, which extends toward the front window shield portion 28, will be pushed back by an internal pressure of the front window shield portion 28 and fold back as shown in FIGS. 15, 16, 17A and 17B, thereby closing the front outlet section 63. However, since the lower end 84*b* of the valve joint 84B is separate from the lower edge partitioning portion 51, a clearance E will be formed between the lower edge 60*c* of the inner tube 60 and the inner circumferential surface 25*a* of the bifurcate passage 25, as shown in FIGS. 16 and 17B. The clearance E in the bifurcate passage 25 will communicate the front window shield portion 28 and the rear window shield portion 33, such that internal pressures of the front window shield portion 28 and rear window shield portion 33 will be equal after a lapse of certain period of time since the inflator stops discharging an inflation gas G.

With the airbag 20B, adequate adjustment of the clearance E will, in the event of a lateral collision of a vehicle, enable the front window shield portion 28 to secure a desired internal pressure for cushioning an occupant's head, due to blocking of the front outlet section 63 by the check valve section 65B, and thereafter will even out an internal pressure of an entire airbag 20B, 5 to 6 seconds after completion of gas supply from the inflator, by way of example, so as to prevent the occupant from being thrown out of the windows W1 and W2. That is, the airbag 20B has an excellent occupant restraining performance not only at lateral collision of a vehicle but also at rollover of the vehicle after lateral collision, since the airbag 20B has an even pressure as a whole and inflates in an integral plate shape during rollover.

If the configuration of the airbag 20 of the first embodiment is adopted instead of the configuration described above, the front window shield portion 28 is enabled to keep its interior pressure after the inflator 16 stops discharging an inflation gas G due to blocking of the check valve section 65. In this case, if opening areas of the front outlet section 63 and rear outlet section 64 are so adjusted that the front window shield portion 28 receives a greater amount of inflation gas G than the rear window shield portion 33, the front window shield portion 28 will cushion a head H of an occupant M seated in a front seat with a higher internal pressure than the rear window shield portion 33, after completion of feeding of the gas G as well as during feeding of inflation gas G.

Now the second embodiment of the invention is described. FIGS. 18A to 19D depict an airbag apparatus S2 according to the second embodiment. The airbag apparatus S2 is a so-called side airbag apparatus which is adapted to be mounted on a lateral of a back rest 91 of a seat 90. The airbag apparatus S2 includes a gas generator or inflator 100 and an airbag 110.

The inflator 100 is housed inside the airbag 110, and includes a generally columnar main body 101 and a cylindrical retainer 102 that holds the main body 101 and mounts the main body 101 on the back rest 91. The retainer 102 includes unillustrated bolts. The main body 101 is provided at the lower end with gas exhaust holes 101*a*, whereas the retainer 102 includes two discharge ports 103 and 104 that discharge an inflation gas emitted from the gas exhaust holes 101*a*.

The airbag 110 includes an airbag body 111 that is inflatable into a generally oval shape elongated in an up and down direction, and an inner tube 130 that is located inside the airbag body 111.

The airbag body 111 is comprised of a main body sheet 125 (FIGS. 19A to 19D) that is a woven fabric of polyamide or the like having flexibility. The main body sheet 125 is doubled at the center on a crease 126 and sewn up at the outer circumferential edge, thereby forming the airbag body 111. The airbag body 111 includes a gas admissive region 112 that is inflatable with an inflation gas G by separating an inboard side wall 112*a* and an outboard side wall 112*b* and a non-admissive region 120 that admits no inflation gas G.

The gas admissive region 112 includes a bifurcate passage 114 and a protection region 116. The bifurcate passage 114 is located proximate the center in an up and down direction of the rear end of the airbag body 111 in a vicinity of the crease 126. The protection region 116 includes a lower inflatable portion 117 and an upper inflatable portion 118, which are respectively located on an upper side and a lower side of the bifurcate passage 114.

The non-admissive region 120 includes a peripheral region 121 formed at sewing up of the outer circumferential edge of the main body sheet 125 and a closing region or partitioning region 122 that sews the airbag body 111 in such a manner as to divide the airbag body 111 in an up and down direction. The closed region 122 extends up to the vicinity of the bifurcate passage 114 from the outer circumferential edge of the airbag body 111, thereby partitioning the lower inflatable portion 117 and the upper inflatable portion 118.

The bifurcate passage 114 is located between the leading end 122*a* of the closing region 122 and the crease 126. In the second embodiment, as described later, an outer circumference of the inner tube 130 in a vicinity of the gas upstream section 131 is jointed to an entire inner circumference of the bifurcate passage 114 by a valve joint 154, and the inner tube 130 is further sewn together with the leading end 122*a* of the closing region 122. That is, an inner diameter of the bifurcate passage 114 conforms to an outer diameter of the inner tube 130 in the vicinity of the gas upstream section 131.

The inner tube 130 is comprised of an inner tube sheet 140 that is a woven fabric of polyamide or the like having flexibility. The inner tube sheet 140 is sewn up into a tapering cylinder, thereby forming the inner tube 130. The inner tube 130 includes at an intermediate region in an up and down direction a gas upstream section 131 where the inflator 100 is located, and a gas outlet section 132 at upper and lower ends. The gas outlet section 132 is comprised of a lower outlet section 133 located at the lower side and an upper outlet section 134 located at the upper side, each of which being provided with an outlet port 132*a* for emitting an inflation gas G. The lower outlet section 133 is tapering in shape and narrower than the upper outlet section 134, and includes at the lower end a check valve section 135. As described above, the region of the inner tube 130 in a vicinity of the gas upstream section 131 is jointed to an inner circumferential surface of the bifurcate passage 114 by the entire circumference in a circumferential direction, at the rear of the leading end 122*a* of the closing region 122, with the valve joint 154 that serves also as a passage blocking joint 156.

The check valve section 135, when the inflator 100 finishes discharging an inflation gas G, will fold back or be pushed back toward the gas upstream section 131 of the inner tube 130 due to an internal pressure of the lower inflatable portion 117, and eventually close off the lower outlet section 133 while contacting the lower end of the inflator 100. In the second embodiment, the lower end of the inflator 100 restricts the position of the check valve section 135 when it folds back, therefore serves as a fold restrictor 160 for the check valve section 135.

In the airbag 110 of the second embodiment, the lower inflatable portion 117 is to cushion a pelvic area of a seated occupant whereas the upper inflatable portion 118 is to cushion a thorax area of the occupant. The lower inflatable portion 117 is designed to inflate with a higher internal pressure than the upper inflatable portion 118 so as to securely receive a pelvis, which is heavy in weight. The difference in internal pressure is enabled by locating the leading end 122*a* of the closing region 122 proximate the inflator 100 while so arranging the inflator 100 that the discharge ports 103 and 104 are located below the closed region 122, i.e., on the side of the lower inflatable portion 117, such that the inflator 100 located at the gas upstream section 131 of the inner tube 130 in the bifurcate passage 114 feeds more inflation gas G to the lower inflatable portion 117, via the lower outlet section 133, than to the upper inflatable portion 118.

Manufacturing of the airbag 110 is now described referring to FIGS. 19A to 19D. Firstly, the inner tube sheet 140 is placed in a flattened fashion on the center of the main body sheet 125, which is also flattened. Then the inner tube sheet 140 is fixed to the main body sheet 125 while forming the valve joint 154, i.e., the passage blocking joint 156, with sewing threads 150. Subsequently, two mounting holes 110*a* for receiving unillustrated bolts of the retainer 102 and a slit or insert hole 110*b* via which the inflator 100 is inserted into the airbag 110 are formed through the inner tube sheet 140 and main body sheet 125. The mounting holes 110*a* and slit 110*b* are located on the side of the gas upstream section 134 relative to the passage blocking joint 156.

Thereafter, the inner tube sheet 140 is doubled and mated outer circumferential edges are sewn together with the sewing thread 150, thereby forming the inner tube 130.

Subsequently, the main body sheet 125 is doubled on the crease 126 and the mated outer circumferential edges are sewn together, thus forming the peripheral region 121. Then if the closing region 122 is formed, the airbag 110 is completed. The closing region 122 is formed to intersect with the passage blocking joint 156 of the inner tube 156.

Thereafter, the inflator 100 is set in the airbag 110 via the insert hole 110*b* such that the bolts of the retainer 102 protrude out of the mounting holes 110*a*, If the airbag 110 is then folded up, the assembly of the airbag apparatus S2 is completed. To mount the airbag apparatus S2 on the back rest 91 of the seat 90, the bolts of the retainer 102 are used to secure the airbag apparatus S2 to the frame of the back rest 91. Then a predetermined lead wire is connected to the main body 101 of the inflator 100 for actuation, a cushioning material is mounted on the back rest 91, and the seat 90 is mounted on board. Thus the airbag apparatus S2 is mounted on a vehicle.

In operation, when the side airbag apparatus S2 is actuated, the inflator 100 discharges an inflation gas G and the gas G flows through the gas upstream section 131 of the inner tube 130 and reaches the lower outlet section 133 and upper outlet section 134 of the gas outlet section 132. Then the gas G flows out of the lower and upper outlet sections 133 and 134 into the lower inflatable portion 117 and upper inflatable portion 118 of the airbag body 111, thus inflating the airbag body 111. Although the lower outlet section 133 is provided with the check valve section 135, the check valve section 135 is formed into a flexible tube that extends and opens toward the lower inflatable portion 117 when pushed by the gas G. Therefore the gas G will reach the lower inflatable portion 117 smoothly.

When the inflator 110 finishes discharging the inflation gas G, the check valve section 135, which had a generally tubular shape, will fold back or be pushed back toward the gas upstream section 131 of the inner tube 130 due to an internal pressure of the lower inflatable portion 117, and eventually close off the lower outlet section 133, thereby preventing the inflation gas G from flowing back toward the inner tube 130 from the lower inflatable portion 117.

That is, the airbag 110 can be provided with a check valve mechanism by simply providing the check valve section 135, which has a flexible, tubular shape with a predetermined length, on the lower outlet section 133 of the inner tube 130 for feeding an inflation gas G to the lower inflatable portion 117 of the airbag body 111. This check valve section 135 is simply formed into a generally tubular shape extending and opening toward the lower inflatable portion 117 when letting out an inflation gas, Accordingly the check valve section 135 will not form a resistance to gas flow and allow an inflation gas G to be smoothly delivered into the lower inflatable portion 117, Therefore, the side airbag apparatus S2 according to the second embodiment of the invention is capable of inflating the airbag 110 quickly and checking the backflow of an inflation gas G smoothly.

Also in the second embodiment, the outer diameter of the lower outlet section 133 at the location of the valve joint (the joint that connects the lower outlet section 133 and the airbag body 111) 154 or passage blocking joint 156 is such a dimension that enables the lower outlet section 133 to inflate integrally with the bifurcate passage 114 at that location. In addition, the valve joint 154 is so formed as to extend up to the non-admissive region 120 (i.e., up to the leading end 122a of the closing region 122) surrounding the bifurcate passage 114.

This configuration will shut off the bifurcate passage 114 where the lower outlet section 133 is located as well when the check valve section 135 closes off the lower outlet section 133. If the bifurcate passage 114, which communicates the lower inflatable portion 117 and the upper inflatable portion 118, will be closed, escape of the inflation gas G from the lower inflatable portion 117 to the upper inflatable portion 118 will be further suppressed. As a consequence, after the inflator 100 finishes discharging inflation gas, the lower inflatable portion 117 having the check valve section 135 will maintain a desired internal pressure for cushioning a pelvis of a vehicle occupant even more securely.

In a similar fashion to the first embodiment, blocking of the lower outlet section 133 takes places when the check valve section 135 is pushed by the internal pressure of the lower inflatable portion 117 and folds back since the internal pressure is higher than that of the upper inflatable portion 118. In the second embodiment, moreover, the bifurcate passage 114 is provided, toward the upper inflatable portion 118, with the mounting holes 110a and the insert hole 110b for the inflator 100. Because the inflation gas leaks from those openings, the internal pressure of the upper inflatable portion 118 reduces, thereby relatively increasing that of the lower inflatable portion 117. As a result, the check valve section 135 will smoothly fold back toward the gas upstream section 131 and block the lower outlet section 133.

Although each of the airbags 20 and 110 of the first and second embodiments has more than one inflatable regions and each of the inner tubes 60 and 130 has accordingly more than one gas outlet sections 62/133 so as to supply an inflation gas G to both of the inflatable regions.

Figure 20A:
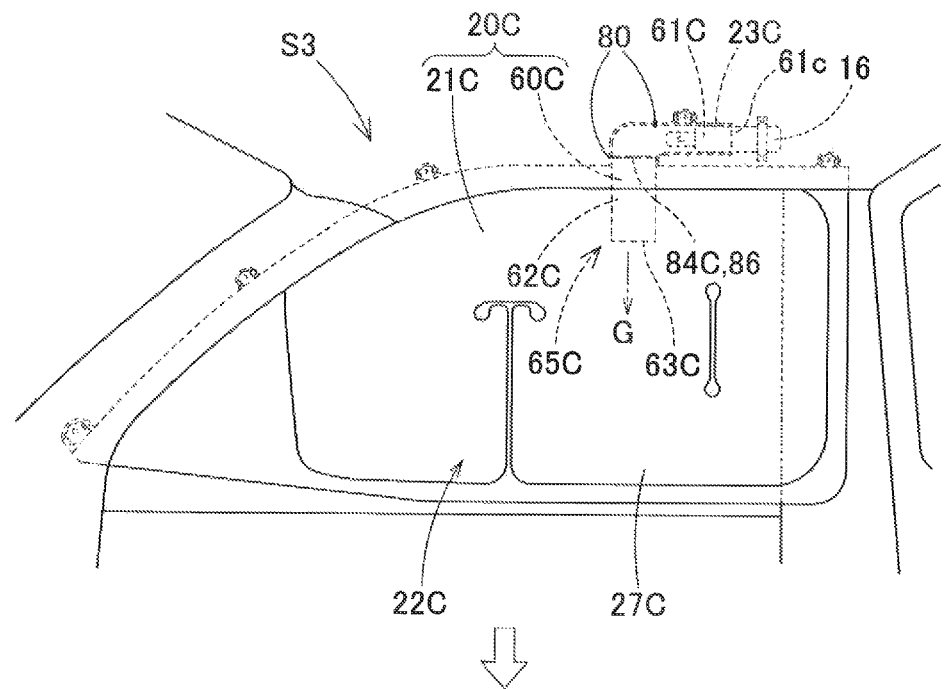
FIG. 20A is a front elevation of an airbag of an airbag apparatus according to a third embodiment of the invention, as inflated.
Figure 20B:
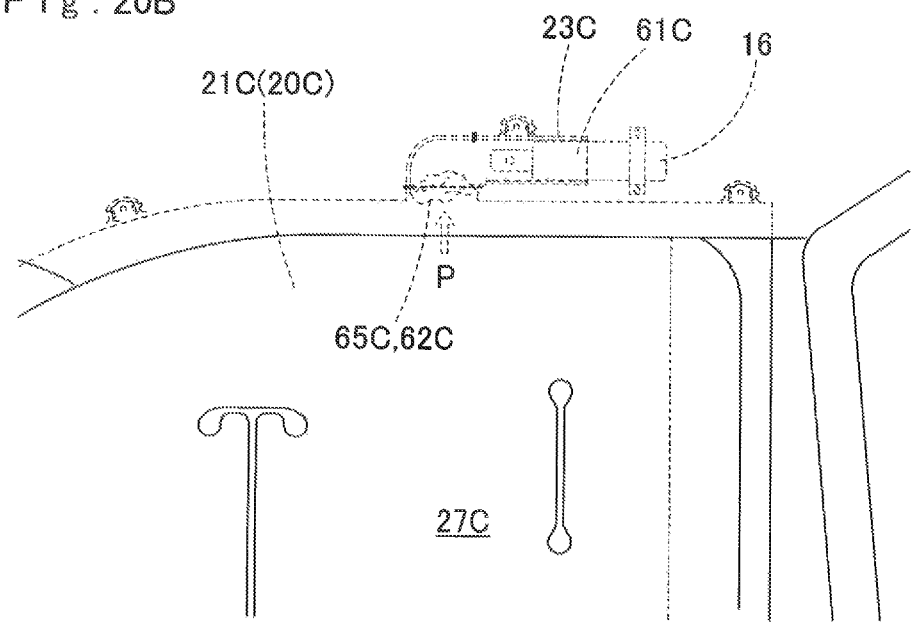
FIG. 20B is a front elevation of the airbag of FIG. 20A, as a check valve section of an inner tube closes off a gas outlet section.

However, it will also be appreciated, as in an airbag apparatus S3 according to the third embodiment of the invention shown in FIGS. 20A and 20B, that an airbag body 21C of the airbag 20C has only one inflatable region (protection region) 27C so as to admit an inflation gas G from an inner tube 60C.

The airbag body 21C includes a joint port 23C connected to the inflator 16 and an inner tube 60C that is cylindrical in shape, located inside the joint port 23C and extends toward the protection region 27C. The airbag body 21C and inner tube 60C are formed of a woven fabric of polyamide or the like having flexibility.

The inner tube 60C includes a gas upstream section 61C that is fastened around the inflator 16 inside the joint port 23C and an outlet section 62C that extends downward from the gas upstream section 61C. The inner tube 60C is sewn to and jointed to the airbag body 21C with sewing threads 80 at a vicinity of the gas upstream section 61C and at a region of the joint port 23C proximate the protection portion 27C. The joint located proximate the protection portion 27C serves as a valve joint 84C. A region of the inner tube 60C on a side of the leading end relative to the valve joint 84C constitutes a check valve section 65C. The valve joint 84C joints an entire circumference of the gas outlet section 62C to an entire inner circumferential surface of the joint port 23C with sewing threads 80. Accordingly, the valve joint 84C also serves as a passage blocking joint 86 that blocks the joint port 23C as well when the check valve section 65C closes the gas outlet section 62C.

In the third embodiment, an inner diameter of the joint port 23C of the airbag body 21C and that of the gas upstream section 610 of the inner tube 60C are respectively slightly greater than an outer diameter of the inflator 16, such that an inflation gas G can leak out of the airbag 20C. That is, a leading end opening 61c of the gas upstream section 610 has a similar structure to a vent hole for exhausting an extra inflation gas G.

When the airbag apparatus S3 is actuated, the inflator 16 discharges an inflation gas G and the gas G flows through the gas upstream section 61C of the inner tube 60C and reaches the gas outlet section 62C. Then the gas G flows out of the gas outlet section 62C into the protection portion 27C, thereby inflating the airbag body 21C. While the inflation gas G is fed from the inflator 16, the gas outlet section 62C extends in a tubular fashion and lets the gas G into the protection portion 27C smoothly. When the inflator 16 then finishes discharging the gas G, the check valve section 65C is pushed back toward the gas upstream section 61C and closes off the gas outlet section 62C and joint port 23C due to an internal pressure P of the protection portion 27C, which pressure goes down due to an exhaust from the leading end opening 61c of the gas upstream section 61C but is higher than the atmosphere. As a consequence, the internal pressure of the protection portion 27C is suppressed from dropping, thereby allowing the protection portion 27C to cushion an occupant's head.

Therefore, the airbag apparatus S3 is capable of inflating the airbag 20C quickly and checking the backflow of an inflation gas G smoothly.

The airbag 20C is provided with the leading end opening 61c of the gas upstream section 61C that serves as a vent. Therefore, when the protection portion 27C is increased in internal pressure after being fully inflated, the inflation gas G will escape from the leading end opening 61c, thereby preventing an undue build-up of the internal pressure of the only one protection portion 27C with a limited volume.

What is claimed is:

1. An airbag apparatus comprising a gas generator and an airbag inflatable with an inflation gas fed by the gas generator, comprising:
   a curtain airbag arranged along peripheral edges of vehicle windows, the curtain airbag being flexible and foldable, and comprising:
   an airbag body inflating with an inflation gas from the gas generator;

an inner tube located inside the airbag body configured to guide an inflating gas stream of the inflation gas to a predetermined inflatable region of the airbag body, the inner tube including;
  a gas upstream section located in an upstream region of the inflating gas stream in the inner tube, and
  a gas outlet section opening toward the inflatable region and feeding the inflation gas to the inflatable region, the gas outlet section including a check valve section for closing off the gas outlet section after the gas generator has finished discharging the inflation gas;
the check valve section having a flexible and generally tubular shape that is continuous in a circumferential direction and is split at only one location and is configured to stream the inflation gas generated by the gas generator into the inflating region without resistance, the tubular shape extending and opening toward the inflatable region due to pressure of the inflation gas streaming into the inflatable region while the gas generator discharges the inflation gas, and
the check valve section having a length that allows the check valve section to fold back toward the gas upstream section due to an internal pressure of the inflatable region after the gas generator discharges the inflation gas, the folded back check valve closing off the gas outlet section and preventing the inflation gas from flowing back into the inner tube.

2. The airbag apparatus as set forth in claim 1, wherein the gas outlet section provided with the check valve section is jointed with the airbag body at a region toward the gas upstream section and in a vicinity of the check valve section.

3. The airbag apparatus as set forth in claim 2, wherein:
the airbag body includes a gas admissive region that is inflatable with an inflation gas by separating opposing walls of the airbag body and a non-admissive region that admits no inflation gas and has opposing walls attached together;
the inflatable regions of the airbag body, which are part of the gas admissive region, are partitioned by the non-admissive region;
the gas admissive region further includes a bifurcate passage that communicates the inflatable regions;
the inner tube is located in the bifurcate passage;
the inner tube includes a plurality of the gas outlet sections, the gas outlet sections being located in the bifurcate passage for streaming an inflation gas to each of the inflatable regions; and
the check valve section is located on at least one of the gas outlet sections.

4. The airbag apparatus as set forth in claim 3, wherein:
an outer diameter of the gas outlet section provided with the check valve section, at a location of a joint that connects the gas outlet section and the airbag, body, is such a dimension that enables the gas outlet section to inflate integrally with the bifurcate passage at that location, and
the joint is so formed as to extend up to the non-admissive region surrounding the bifurcate passage.

5. The airbag apparatus as set forth in claim 3, wherein the inflatable region having the check valve section includes an inflatable main body and a pressure control chamber that is in gas communication with the inflatable main body via a constricted communication passage and absorbs an inflation gas from the inflatable main body via the communication passage in order to restrain a pressure build-up in the inflatable main body.

6. The airbag apparatus as set forth in claim 3, wherein:
the curtain airbag is configured to cover inboard sides of a front window and a rear window disposed side by side on a lateral of a vehicle;
the bifurcate passage is so arranged to extend in a front and rear direction along an upper edge of and in a vicinity of a center in a front and rear direction of the airbag body as deployed;
a front window shield portion and a rear window shield portion, which serve as the inflatable regions, are respectively located in front of and at the rear of the bifurcate passage and in gas communication with the bifurcate passage for covering the front and rear windows, respectively;
the gas upstream region of the inner tube is located proximate the upper edge of and in a vicinity of the center in a front and rear direction of the airbag body in such a manner as to extend upward for connection with the gas generator; and
the gas outlet section includes a front outlet section and a rear outlet section that bifurcate forward and rearward at a lower end of the gas upstream section and located, inside the bifurcate passage.

7. The airbag apparatus as set forth in claim 6, wherein both of the front outlet section and the rear outlet section are provided with the check valve section.

8. The airbag apparatus as set forth in claim 6, wherein:
the check valve section is located only in the front outlet section;
an outer diameter of the front outlet section, at a location of a joint that connects the front outlet section and the airbag body; is such a dimension that enables the front outlet section to inflate integrally with the bifurcate passage at that location; and
the joint is separated from the non-admissive portion surrounding the bifurcate passage so as to form a clearance between the inner tube and the bifurcate passage for communicating the front window shield portion and the rear window shield portion at full inflation of the airbag, such that an internal pressure of the front window shield portion and that of the rear window shield portion are equalized in the event of a rollover of a vehicle while the front window shield portion is prevented from losing its internal pressure in the event of a lateral collision.

9. The airbag apparatus as set forth in claim 2, wherein:
the airbag body further includes a joint port for connection with the gas generator and a protection region, as only one said inflatable region;
the inner tube is formed into a tube that extends from the joint port toward the protection portion;
the gas upstream region is located at a region of the inner tube mounted around and jointed to the gas generator inserted into the joint port; and
the gas outlet section is located at a region of the inner tube toward the protection portion and provided with the check valve section.

10. The airbag apparatus as set forth in claim 1 wherein the gas outlet section narrows toward a leading end.

11. The airbag apparatus as set forth in claim 1, wherein the gas upstream section of the inner tube is formed into a tube protruding out of the airbag body and is connected with the gas generator whereas the gas outlet section is located inside the airbag body; and
the inner tube is formed by doubling a sheet material, and the gas upstream section and gas outlet section are continuous.

* * * * *